(12) United States Patent
Thoms et al.

(10) Patent No.: US 9,976,649 B2
(45) Date of Patent: May 22, 2018

(54) METHOD AND ARRANGEMENT FOR THE DECELERATION OF A HYDROSTATIC TRANSMISSION

(71) Applicant: Danfoss Power Solutions GmbH & Co. OHG, Neumunster (DE)

(72) Inventors: Reinhardt Thoms, Holzbunge (DE); Martin Wuestefeld, Neumunster (DE)

(73) Assignee: Danfoss Power Solutions GmbH & Co. OHG, Neumunster (DE)

( * ) Notice: Subject to any disclaimer, the term of this patent is extended or adjusted under 35 U.S.C. 154(b) by 371 days.

(21) Appl. No.: 14/803,508

(22) Filed: Jul. 20, 2015

(65) Prior Publication Data

US 2016/0025215 A1    Jan. 28, 2016

(30) Foreign Application Priority Data

Jul. 23, 2014    (DE) .................. 10 2014 214 441

(51) Int. Cl.
| | |
|---|---|
| *F16H 61/4017* | (2010.01) |
| *F16H 61/475* | (2010.01) |
| *F16H 61/4157* | (2010.01) |

(52) U.S. Cl.
CPC ..... *F16H 61/4017* (2013.01); *F16H 61/4157* (2013.01); *F16H 61/475* (2013.01)

(58) Field of Classification Search
CPC . F16H 61/4017; F16H 61/4157; F16H 61/475
(Continued)

(56) References Cited

U.S. PATENT DOCUMENTS

| | | | | |
|---|---|---|---|---|
| 3,981,374 A | * | 9/1976 | Johns, Jr. ............... | B62D 59/04 180/14.3 |
| 4,559,778 A | * | 12/1985 | Krusche .................. | F16H 61/46 417/217 |

(Continued)

FOREIGN PATENT DOCUMENTS

| | | |
|---|---|---|
| CN | 87102639 A | 12/1987 |
| CN | 101156007 A | 4/2008 |

(Continued)

*Primary Examiner* — Michael Leslie
*Assistant Examiner* — Richard Drake
(74) *Attorney, Agent, or Firm* — McCormick, Paulding & Huber LLP

(57) ABSTRACT

Method for deceleration of a hydrostatic transmission 3 driven by a drive motor 2 comprising a closed hydraulic fluid circuit, in which a hydraulic pump 4 coupled mechanically with the drive motor 2 and a hydraulic motor 5 are arranged. Two hydraulic lines 6, 7 connect the hydraulic pump 4 and the hydraulic motor 5 and constitute for the hydraulic motor 5 according to the drive direction of the hydrostatic transmission 3 a supply line 6 and a return line 7. In at least one of the two hydraulic lines 6, 7 a throttle valve 16 is arranged being adjustable in its throttle cross section which, if the corresponding hydraulic line 7 is a return line 7 for hydraulic fluid under high pressure towards the hydraulic pump 4 is being adaptable in its throttle cross section dynamically such that the adjustable hydraulic power in return line 7 downstream of throttle valve 16 at any time during a coasting mode corresponds to the maximum power being supportable at the drive motor 2 in consideration of the power consumption of auxiliary consumers 100 and power losses.

15 Claims, 6 Drawing Sheets

(58) Field of Classification Search
USPC .................................. 60/449, 459; 137/488
See application file for complete search history.

(56) References Cited

U.S. PATENT DOCUMENTS

| | | | | |
|---|---|---|---|---|
| 4,571,941 | A * | 2/1986 | Aoyagi | E02F 9/123 60/435 |
| 5,875,630 | A * | 3/1999 | Walsh | B62D 5/07 60/421 |
| 6,338,247 | B1 | 1/2002 | Drin | |
| 6,360,537 | B1 * | 3/2002 | Widemann | F16H 61/4035 60/451 |
| 8,266,903 | B2 * | 9/2012 | Kowatari | E02F 9/2246 60/434 |
| 8,966,892 | B2 * | 3/2015 | Opdenbosch | F15B 11/08 60/420 |
| 9,574,581 | B2 * | 2/2017 | Krug-Kussius | F15B 13/026 |
| 2008/0078456 | A1 * | 4/2008 | Thoms | E02F 9/226 137/488 |
| 2010/0319337 | A1 * | 12/2010 | Jene | F15B 11/0445 60/459 |
| 2014/0075930 | A1 | 3/2014 | Maiyur et al. | |

FOREIGN PATENT DOCUMENTS

| | | |
|---|---|---|
| CN | 102555793 A | 7/2012 |
| DE | 199 30 997 A1 | 5/2000 |
| DE | 10250903 A1 | 5/2004 |
| DE | 10 2004 030 045 B3 | 11/2005 |
| WO | 2011/069597 A1 | 6/2011 |
| WO | 2013/083234 A1 | 6/2013 |

* cited by examiner

METHOD AND ARRANGEMENT FOR THE DECELERATION OF A HYDROSTATIC TRANSMISSION

CROSS REFERENCE TO RELATED APPLICATION

Applicant hereby claims foreign priority benefits under U.S.C. § 119 from German Patent Application No. DE 102014214441.8 filed on Jul. 23, 2014, the contents of which are incorporated by reference herein.

TECHNICAL FIELD

The invention relates to a method and an arrangement for the deceleration of a hydrostatic transmission being driven by a drive motor.

BACKGROUND

For this a hydraulic pump is driven by the drive motor, e.g. a combustion engine in particular a diesel engine and provides the hydraulic motor with hydraulic power in form of supplying a hydraulic fluid flow under high pressure. The hydraulic motor converts the hydraulic power supplied by the hydraulic pump into mechanical power for the propulsion of a consumer. In case of a hydrostatic transmission the hydraulic motor drives the driving wheels of a working machine or a vehicle. In coasting mode, i.e. when the vehicle wheels drive the hydraulic motor, the flow of power runs from the hydraulic motor to the hydraulic pump, whereas the directions of rotation and conveyance remain the same as well as the direction of flow in the hydraulic lines, and only the high pressure line switches with the low pressure line and vice versa.

In such hydrostatic drives closed hydraulic circuits are used preferably, whereby both hydrostatic driving mechanisms—the hydraulic pump and the hydraulic motor—are connected by hydraulic lines, being according to the drive direction of the hydraulic pump a supply or a return line for hydraulic fluid. Further, depending on the operation mode—acceleration mode or coasting mode—every line can be a low pressure line or a high pressure line. Hence, each of the hydraulic lines connecting both hydrostatic driving mechanisms with each other can be i) a supply line with hydraulic fluid under high pressure or ii) a return line with hydraulic fluid under low pressure as well as iii) a supply line for fluid with low pressure or iv) a return line with hydraulic fluid under high pressure (coasting mode).

Particularly, in coasting mode, when the hydraulic motor provided for the propulsion, works as a pump and the hydraulic pump has to receive the hydraulic fluid conveyed by the hydraulic motor, a breaking, coasting or drag torque of the driving motor is used for decelerating the hydrostatic drive. In such a coasting mode, e.g. by downhill drive of a vehicle or a working machine, the hydraulic motor drives the pump which in turn drives the driving motor. As the hydraulic pump working in coasting mode as a hydraulic motor as well as the drive motor only bears limited rotational speed, in order to avoid damages at the respective driving mechanism a speed limitation has to be provided.

For this reason, according to DE 199 30 997 B4 a throttle valve was proposed to be introduced into the return line and which comes into effect if the hydraulic fluid flowing from the hydraulic motor to the displacement pump shows an increased pressure. If the pressure in the return line passes a given threshold value, the throttle comes into effect and the pressure being conveyed to the hydraulic pump by the return line is limited to a fixedly and unchangeable set support pressure during the further coasting mode of the work machine or the hydrostatic drive. The excess of hydraulic power introduced by the hydraulic motor into the return line is, according to DE 199 30 997 B4 transformed in heat energy—as customary according to the state of the art.

In DE 10 2004 030 045 B3 a throttle being controlled by a pressure relief valve is foreseen for avoiding overspeed of the driving motor. The control pressure for controlling the throttle valve is generated by a pilot pressure taken from the return line. The maximum of the control pressure is given by a pilot pressure relieve valve fixedly and unchangeable. The pilot pressure relieve valve opens by exceeding the permissible pilot pressure in the pilot line, whereby the pilot line is fluidly connected with the return line. The pressure of the return line now moves the throttle valve by pressurizing the throttle valve spool against the lower pilot pressure into a position in which the flow rate cross-section is lowered. Thereby, the pressure in the return line and, hence, as well in the pilot line decreases. If the pressure in the pilot line falls below the threshold pressure of the pilot relieve valve, the pilot relieve valve closes again and the pressure in the return line increases the pilot pressure again, what in turn augments the flow rate cross-section by shifting the throttle valve spool. Thereby, the pressure in the return line and in the pilot line increases again, until the pilot pressure relieve valve opens again, in order to shift the throttle valve spool and lowering the flow rate cross-section, i.e. the throttle cross section. This procedure occurs periodically as long as the pressure in the return line upstream of the throttle valve is higher as the maximum pressure given for the pilot relieve valve which should not be exceeded downstream of the throttle valve. The pilot volumetric flow rate under pilot pressure used to actuate the pilot pressure relieve valve is conducted to an area with lower pressure, e.g. to a tank and withdraws hydraulic fluid from the hydrostatic drive disclosed in DE 10 2004 030 045 B3. In opposite, reversed flow direction and, correspondingly high pilot pressure, the throttle valve spool closes equally and a check valve arranged in parallel is opened such that the hydraulic fluid flow rate is not throttled. However, hydraulic fluid volume gets lost for the working circuit as the pilot pressure relieve valve arranged in the pilot line opens by exceeding continuously the given pilot pressure and, in this manner, takes out a pilot hydraulic fluid flow of the working circuit. This hydraulic fluid flow is absent for the hydrostatic drive, whereby the hydrostatic drive according to DE 10 2004 030 045 B3 cannot transform the whole hydraulic power generated by the hydraulic pump into mechanical power.

In both systems the maximum permissible break power/drag power available at the driving motor is not used optimal as further consumers connected with the drive motor are not considered with regard to its power consumption. Likewise other power losses, the driving machine is subject to, as friction losses, rolling and air resistance are not taken into account in the known decelerating methods. In the known methods systems for hydrostatic deceleration of a hydrostatic drive, the pressure in the return line downstream of the throttle valve—denoted in the following as support pressure—is limited fixedly to a value by the pilot pressure relieve valve. In the known state of the art this maximum support pressure is specifically and unchangeable determined for a driving motor of a work machine. For protection of the work machine and the machine operator under consideration of all possible operation conditions, a work machine can adapt, the support pressure may be chosen to safety reasons only such high that only such an amount of hydraulic power is maximally fed to the hydraulic pump as the driving motor in the coasting mode can received, if no further consumer is coupled to the driving motor, in order that no over speed or damaging on its own of the driving motor or the working machine may occur in any coasting operation condition, in particular not, if no (auxiliary-) consumer power or power losses lowers the revolution of the driving motor. Hence, the predetermined support pressure has to be adapted due to safety reasons to the maximum permissible break power/drag power of the driving motor without taking into account further consumers or auxiliary drives, which can be active in a drag condition as well. However, typically, the driving motor propulses further consumer or auxiliary drives of a work machine which also consume power in a coasting operation. This power consumption being present in a coasting operation of the hydrostatic drive additionally, not only is unconsidered in the known deceleration systems, since furthermore has to be converted into heat power in order to reach the desired deceleration, likewise the exceeding hydraulic power which cannot be decelerated mechanically. At the same time, the driving motor according to the methods known from the state of the art will not reach their maximum permissible drag revolutions in drag operations, if the presented power of (auxiliary-) consumers is bigger than zero and which power of the (auxiliary-) consumers are lowering the revolutions of the driving motor, therefore, the known deceleration methods do not exploit optimally the hydraulic power supportable at the driving motor, in particular not if the power of (auxiliary-) consumers is bigger than zero.

In case of the solution known from the state of the art according to DE 10 2004 030 045 B3 it can be seen additionally that this system generates vibrations as the pilot pressure relieve valve used for controlling of the throttle cross section, is opened and closed repeatedly during the coasting operation, such that the throttle valve spool changes permanently its relative position and opens and closes the flow cross section in an oscillating way.

Furthermore, in the state of the art according to DE 199 30 997 B4, it is proposed to bypass the throttle/the throttle valve by a bypass line for the reverse mode, i.e. during reversed flow direction in the hydraulic circuit, such that the throttle valve does not form a flow resistance for the reverse mode. Herefor, a check valve is provided in the bypass line opening only if the hydraulic line forms a supply line for the hydraulic motor. Such a design as exemplarily shown in FIG. 1 of DE 199 30 997 B4 is bulky, complex, needs valuable construction space and causes high costs.

SUMMARY

Objective of the invention is to provide a method and a device for the same, with which the entire brake or drag power being available at the drive motor is used optimally during a coasting mode of a hydrostatic drive of work machine, whereby power consumption of further connected consumer as well as power losses to which the work machines subject too, are used during deceleration in coasting conditions of a hydrostatic drive. Thereby, the construction—type given maximal admitted drag or support rotational speed of the driving motor or the hydraulic pump should not be exceeded. Further, the inventive method should be in its application and performance simple and save in operation. Furthermore, the provided devices for performing the inventive method should be inexpensive and robust as well should provide a maximum of safety in all operational states of a drive or coasting operation. Therefore, the device should manage it with as less as possible parts as well as less as possible construction space and should guarantee a sensible and quick reaction on changing operational parameters. The inventive method and the inventive device should be capable to fully forward in the driving mode the hydraulic power created by the hydraulic pump to the hydraulic motor, in particular, as well as in case of a reversed flow of the hydrostatic transmission.

The objective is resolved according to a method for deceleration of a hydrostatic transmission being driven by a drive motor and comprising a closed hydraulic fluid circuit, in which a hydraulic pump being coupled mechanically with the drive motor and a hydraulic motor are arranged and with two the hydraulic pump and the hydraulic motor connecting hydraulic lines which according to the drive direction of the hydrostatic transmission can be a supply line or a return line for the hydraulic motor whereby in at least one of the two hydraulic lines a throttle valve is arranged being adjustable in its throttle cross section and which, if the corresponding the hydraulic line is a return line for hydraulic fluid under high pressure towards the hydraulic pump is dynamically adapted in its throttle cross section such that the hydraulic power adjustable downstream of the throttle valve in the return line during a coasting mode corresponds to the power, which under consideration of the power consumption of auxiliary consumers and power loses can be supported maximum at the drive motor.

The inventive method for decelerating a transmission system being a drive by a driving motor of a work machine, comprising a closed hydraulic fluid circuit, maintains the rotational speed of the drive motor during the coasting operation at its maximum admitted drag rotational speed or throttle rotational speed, respectively, if the hydraulic power of the hydraulic motor is higher than the maximum drag power being supportable at the driving motor. Hereby, the maximum drag revolution speed is given usually for instance by the manufacturer of the drive motor according to the type of construction. In a hydrostatic transmission which can be decelerated according to the invention, a hydraulic pump coupled with the drive motor and a hydraulic motor as well as two hydraulic lines connecting both hydraulic drive mechanisms are arranged, which, according to the direction of propulsion, i.e. the direction of flow of the hydraulic fluid in the hydrostatic circuit can, be a supply or a return line for the hydraulic motor.

In course of the further description of the invention the driving mechanisms arranged in each of the hydraulic pump and the hydraulic motor for the transformation of hydraulic power into mechanical power and vice versa are denoted for the sake of simplicity as hydraulic pump or hydraulic motor, respectively. However, in practice, these terms and encompass further mechanic or hydraulic devices, lines, valves etc. connected to the corresponding driving mechanisms forms hydraulic pump or hydraulic motor assembly groups, respectively, and, in particular, are often arranged in common casings.

In at least one of two hydraulic lines connecting the mechanism of the hydraulic pump with the drive mechanism of the hydraulic motor, a throttle valve being adjustable in its throttle cross section is arranged according to the invention. Thereby, the throttle valve can be for instance part of a hydraulic pump or hydraulic motor assembly group or being part of a hydraulic line connecting such assembly groups, whereby the hydraulic line maybe at least partially be integrated into the assembly group or being a mounting part of such an assembly group. In case the hydraulic line, in which the throttle valve is arranged, forms a return line conducting hydraulic fluid under high pressure towards the hydraulic pump, the throttle valve is adjustable during such a coasting operation according to the invention in its throttle cross section variably and dynamically such that the hydraulic power appearing downstream of the throttle valve in the return line correspond to the power which can be forwarded by the hydraulic pump or the driving mechanism of the hydraulic pump as maximum mechanic power to the drive motor in order to maintain the drive motor during the coasting mode on a maximum admissible coasting revolution speed, at which the drive motor comprises its maximum coasting or drag power or break power. At the same time the inventive method or the inventive arrangement protects also the hydraulic pump as well as the propulsion motor of overspeed.

The inventive method for power and rotation speed adapted adjustment of the throttle cross section, however, applies only in case the power generated by the hydraulic motor is higher than the power being supportable via the hydraulic pump at the drive motor. In case the power generated by the hydraulic motor is smaller as the power supportable at the drive motor, this power need not to be throttled, as a danger of overspeed of the driving motor is not given. In such a case throttling would be contrary to the teaching for achieving a deceleration with which the support torque being available at the driving motor should be utilized at its maximum.

However, the maximum drag power which can be used for deceleration the hydrostatic transmission is, in particular, given only partly by the support torque and the maximum rotational speed of the drive motor in coasting mode. This maximum mechanical power, which can be decelerated at the drive motor is denominated in the art commonly as drag power, motor break power or as well as break power and often is predefined by the manufacturer of the drive motor such that the drive motor can guarantee repeatedly and endurable coasting modes, however, the maximum hydrostatic deceleration power of the whole work machine or the whole vehicle, respectively, which can be used or utilized, for slowing down the hydrostatic transmission is composed of a plurality of components. One of these components is the design-inherent maximum admissible motor brake power of the driving motor, which is reached at the maximum admissible drag revolution speed for the driving motor in coasting mode. This rotational speed must not passed over in coasting mode by the mechanical power forwarded from the hydraulic pump to the drive motor, as it might come to damages at the driving motor. However, this is not true if the hydraulic pump used in the hydrostatic transmission comprise design-inherent a lower maximum limited revolution speed for the concrete coasting mode and if the hydraulic pump reaches for example its limited revolution speed before the driving motor reaches his limit. In this case the rotational speed limit is defined according to rotational speed capability of the hydraulic pump.

Another component of the total available hydrostatic deceleration power of a working machine are the additional consumers and (auxiliary) drives being driven by the driving motor. This can for example be an auxiliary-drive power consumption for fans, mixer drums, work drives, e.g. as winch drives and/or lifting drives, etc. The maximum deceleration power being available at the drive motor or the total braking power is therefore greater than the motor brake power being provided by the drive motor solely in coasting mode. Often, in the coasting mode of a work machine further consumers and auxiliary drives are used aside the hydrostatic transmission and whose power consumption can be utilized for slowing down/decelerating the hydrostatic transmission. However, these auxiliary power consumptions do not comprise the same height in each coasting operation and can also fluctuate during the coasting operation. Therefore, they are not included in conventional deceleration methods as they may be zero in individual cases. However, the method according to the invention also utilizes these consumer powers for decelerating a hydrostatic transmission according to the invention. This is done in that the hydraulic power guided to the hydraulic pump is controlled such that the mechanical support of the hydraulic pump on the drive motor is just that high that the drive motor is driven in coasting mode to its maximum admissible drag rotation speed or held there. Thereby, rotational speed changing consumer loads of consumers driven by the driving motors are automatically taken into account automatically and the maximum available drag power for decelerating the hydrostatic transmission at the drive motor can be used always.

A further component of power which can be used for a deceleration in coasting mode forms as well all power losses that may occur on a working machine, and which have a rotational speed lowering effect on the drive motor. Examples of these are all mechanical as well as hydraulic friction losses and/or flow, air and/or rolling resistances etc.

In the previous applied methods known from the state of the art only the maximum deceleration power of the drive motor was used as a limiting factor for the used (pilot) pressure relieve valves for the control of the throttle valves. The energies of the further consumers and auxiliary drives being driven by the drive motor had to be disregarded due to safety reasons and due to protection of the work machine, as these in normal cases are not operated permanently and/or not operated at constant power. So, for example the speed of a cooling fan is depending on the oil temperature and not on the required deceleration power of the work machine. The inventive method takes into account these fluctuating consumer powers in that the hydraulic power which arise in the return line downstream of the throttle valve is adapted in coasting mode at any time to that power value, which can be forwarded by the hydraulic pump as mechanical power to the drive motor plus auxiliary consumers and plus power losses in order to hold the drive motor in coasting mode on the revolution speed corresponding to its maximum admissible motor deceleration power. If, for instance, the required power for cooling the hydraulic fluid or the cooling fluid of a drive motor increases, the increase of consumer consumption can be taken into account by the inventive method by increasing the deceleration power for the hydrostatic transmission, as consumer power inherent rotational speed reduction at the drive motor can be compensated by increasing the hydraulic power with which the hydraulic pump supports itself on the drive motor.

With the inventive method it is ensured that in a coasting operation all consumer power and also friction losses additional to the maximum admissible motor brake power of the drive motors can be used for slowing the hydrostatic transmission of the working machine, whereby the inventive method can react flexible on changing consumer and (auxiliary) drive power as well as power losses, as the mechanical power forwarded of the hydraulic pump in coasting operation to the drive motor is flexibly adapted such that the rotational speed of the drive motor is held on that value, on which it shows its maximum admissible motor brake power, and such that the rotational speed is also not exceeded. Naturally, the inventive method operates only then regulatory on a throttle valve, if the power generated by a hydraulic motor in coasting mode is higher than the sum of all available powers decelerating the hydrostatic transmission, as deceleration and consumer powers and any eventual present power losses of the hydrostatic transmission at the drive motor and/or at the work machine.

By the use of the maximum drag rotation speed of the drive motor or the maximum admissible rotational speed of the hydraulic pump as control value on which the drive motor shows its maximum motor deceleration power, automatically all further auxiliary consumer powers are taken into account, which—not only in coasting mode—lower the rotational speed of the drive motor.

If the required drive power of the additional consumers for example is 20% of the drag power of the drive motor, the hydraulic power supportable on the drive motor, with which the hydraulic pump support itself on the drive motor, can be increased about this value as this is admissible by the limited pressure in the return line according to the methods known of the state of the art. In these methods the pressure is fixedly, unchangeable set by means of pilot pressure relief valves due to safety reasons, as already described above.

Thereby, the resulting hydraulic power after the throttle valve in the return line is controlled according to the invention such that it is not depending on the hydraulic power being introduced into the return line by the hydraulic motor since controlled such that the hydraulic power of the hydraulic pump holds the drive motor on its admissible maximum drag revolution speed. For adjusting or controlling of the hydraulic power, downstream of the throttle valve in the return line the inventive method uses preferably the rotational speed of the drive motor and further preferably that rotational speed of the drive motor, on which the drive motor shows its maximum admissible deceleration power. If the rotational speed of the drive motor increases during coasting operation, because for example a side consumer does not take off power anymore, the flow cross section of the throttle valve and, consequently, the pressure in the return line according to the invention has to be lowered such that the hydraulic power, with which the hydraulic pump supports itself on the drive motor drops and the drive motor will not over-speed. If, the power consumed by the auxiliary consumers, the hydraulic power in the return line after the throttle valve conveyed to the hydraulic pump has to be lowered as well, which in term means that the flow cross section of the throttle valve must be lowered and therefore the pressure in the return line drops, whereby the revolution speed of the drive motor does not exceed the admissible maximum drag rotational speed.

In the opposite case, if the driving rotational speed of the drive motor during coasting mode falls because exemplarily an auxiliary consumer takes more power, what means that the throttle effect is set to high and that the drive motor can bear more deceleration power. Hence, according to the inventive method, the throttle cross section will be increased, whereas the pressure in the reversed line and the hydraulic power of the hydraulic pump increases and the rotational speed of the drive motors can be lifted up. At the same time, less power generated by the hydraulic motor, which is not supportable on the drive motor—excess of hydraulic power—must be transformed within the closed hydraulic fluid circuit into heat.

Especially in this case, another advantage of the inventive method is shown, as in consequence of an increase of power consumption by an additional drive, the pressure in the return line can be increased and remains not, according to the state of the art, on a (limited) pressure level, which is given solely by the admissible maximum brake power of the drive motor fixely. Hence, via the hydraulic pump motor more power can be given to the drive motor as this is possible with the decelerating methods according to the state of the art, which do not take into account (auxiliary) consumer powers and therefore are not able to adapt the maximum reachable deceleration of the hydrostatic transmission to power fluctuations of the (auxiliary) consumers or to power losses.

A work machine equipped with a hydrostatic driving system shows on an asphalt road a lower rolling resistance as the same work machine exemplarily on a field. The inventive deceleration method is capable to take into account such a fluctuation of a power loss due to the flexible adjustability of the hydraulic power, which can be supported in coasting operation on the drive motor and hence transform it into a deceleration power for the hydrostatic transmission. Hence, according to the invention in the example of a work machine on a field less kinetic energy has to be transformed in heat as it would have to be the case on the asphalt. In the methods known from the state of the art, the mechanical power forwarded to the drive motors for decelerating by means of the drive motor in both cases would be the same and, at the same time, the lower one of both deceleration powers, since it would come to an overspeed of the drive motor, if the working machine should be decelerated on an asphalt road.

Additionally, the inventive method is independent of the power which is brought into the return line by the hydraulic motor. Especially, it is independent of the revolution speed and the set conveying volume of the hydraulic motor. The inventive method controls by regulating the flow cross section of the throttle valve arranged in the return line the hydraulic power forwarded by the return line to the hydraulic pump and regulates the hydraulic power in the return line downstream of the throttle valve always on that power value, which actually can be forwarded from the hydraulic pump to the drive motor taking into consideration the further consumers of the hydrostatic transmission, even if the operational parameter of the work machine are changed. Excess power generated by the hydraulic motor during coasting operations can be, however, exemplarily as usual, transformed into heat power, exemplarily by high pressure—pressure relief valves.

Preferably, the inventive method uses the rotational speed of the drive motor or the hydraulic pump for controlling of the power conducted to the hydraulic pump in order to control the flow cross section of the throttle valve such that an optimum use of the drag power being available at the drive motor can be done. Preferably, the inventive method uses as additional control value, exemplarily the conveying or drag volume being adjustable at the hydraulic pump and/or at the hydraulic motor in order to hold the concerned driving mechanism operationally depending at an as possible optimum operation parameters.

In an exemplary embodiment the inventive method uses a throttle valve with a throttle valve spool which can be pressurized on two sides with hydraulic fluid pressure, whereby the pressure being present downstream of the throttle valve in the return line, the so-called support pressure, is conducted in such a manner on the first front face of the throttle valve spool that the resulting hydraulic force shows a flow cross section lowering effect on the throttle valve. According to the invention the other, the second front face of the throttle valve spool is pressurized either with the same pressure or with the pressure present upstream of the throttle valve in the return line. This (high) pressure, acting on the second front face of the throttle valve is according to the invention reducible in its height controlled by a device, preferably a hydraulic valve.

In the following course of the description of the invention this pressure being guided on the second front face of the throttle valve spool is denominated as pilot pressure and the device used for its controlled reduction is called pilot valve. For the realization of the inventive method the concrete design of the pilot valve is not relevant, since only the fact that the pilot valve reduces the pilot pressure in function of the rotational speed of the drive motor or the hydraulic pump, respectively sets this pressure, i.e. reduces the same, if the rotational speed of the drive motors is getting too high, or, respectively, increases the pilot pressure if the rotational speed of the drive motor is lower as the maximum admissible drag operational speed. Essential to the invention is that the signal used for actuating/adjusting the pilot valve is depending on the rotational speed of the drive motor or, respectively, is depending on the rotational speed of the driving mechanism of the hydraulic pump. Hereby, the signal is designed preferably such that the signal strength increases with increasing rotational speed. Further preferable, if a predefined maximum drag limit rotational speed is reached, the reduction of the pilot pressure increases with increasing rotational speed, i.e. the pilot pressure decreases—absolutely seen—with increasing drive motor operational speed. Thereby, the hydraulic force on the second front face of the throttle valve spool decreases as well, if the predefined limit operational speed of the drive motor or the hydraulic pump given for the coasting operation is exceeded. That rotational speed limit which initiates a controlled reduction of the pilot pressure depends on the type, the construction type, the model and/or the size of the drive motor or the hydraulic pump, respectively, which are used for driving the same. The rotational speed limit for the coasting operation is given frequently by the manufacturer of the drive motor.

According to the invention the throttle valve spool is hold by adjustable forces, which act on his first and second front face in an adjustable power balance, which determines the relative position of the throttle valve spool in the throttle valve and, therefore the throttle cross section Hereby, the forces on the first front face of the throttle valve spool comprise a closing, i.g. a throttle cross section lowering effect and the forces on the second front face of the throttle valve spool comprise an opening, i.e. a throttle cross section decreasing effect on the throttle valve. If the forces on both front sides are balanced, the throttle valve spool maintains a position corresponding to one balance of forces. Preferably on the second front face of the throttle valve spool a spring force is acting, pushing the throttle valve spool into the opening position, if the hydraulic pressure forces on both sides of the throttle valve spool are in general of the same size or its effects on the throttle valve spool eliminates each other.

Assuming an operational situation of the hydrostatic transmission in which no reduction of the hydraulic power in the return line is required for instance in a driving operation, according to the invention, the throttle valve has to be in its maximum open position in order to not reduce the throttle cross section. With the requirements that on both sides of the throttle valve the pressure in the return line should be of the same height and, at the same time, no power reduction should take place, results that the pilot pressure must correspond to at least the pressure in the return line to enable the throttle valve spring to shift the throttle valve spool into the position in which the throttle cross section is maximum open (hydraulic force balance on both front faces of the throttle valve). According to the invention, the two hydraulic forces on the first and on the second front face of the throttle valve spool keep the throttle valve spool in a kind of a pressure balance if the pressure forwarded on both front sides are of equal height as the effective surfaces for the generation of hydraulic forces on both front sides of the throttle valve spool are preferably of the same size.

If, according to the invention, the pilot pressure is reduced and if the drive motor or the hydraulic pump exceeds the admissible limit value, the throttle valve spool in the throttle valves is shifted such that the flow cross section is lowered, as the sum of opening forces from the pilot pressure and the throttle valve springs are lower as the closing pressure force resulting from the support pressure. However, with the reduction of the flow cross section the support pressure arising downstream after the throttle drops, which in turn results in a reduction of the closing pressure force. Consequently, for each given pilot pressure a new force balance arises at the throttle valve spool in which the pressure force from the reduced pilot pressure together with the spring force of the throttle valve spring balance the closing pressure force caused by the arising support pressure. This support pressure forms together with the hydraulic fluid volume flow rate in the return line the hydraulic power—eventually reduced—with which the hydraulic pump can support itself against the drive motor. This power may be maximally such high that the drive motor or the hydraulic pump is not over-revved, i.e. the maximum admissible drag rotation speed of the drive motor or the maximum admissible rotational speed limit of the hydraulic pump must not be exceeded. Consequently, with the adaptation of the pilot pressure in coasting operation the maximum admissible drag rotational speed of the drive motor is adjusted and maintained, such that the maximum admissible rotational speed is not exceeded. If, as provided according to the invention, the reduction of the pilot pressure depends on the rotational speed of the drive motor and/or the hydraulic pump and this reduction starts if the drive motor rotational speed exceeds a given limited rotational speed, the hydraulic power after the throttle valve in the return line forward to the hydraulic pump is set in an self-actuating manner to a power, with which the hydraulic pump is capable to maximally support itself against the drive motor, without over-revving the same. By the inventive pilot pressure controlled pressure balance at the throttle valve spool it is achieved that by presetting the height of the pilot pressure a self-adaptation of the hydraulic power is done and the drive motor will not overspeed. According to the invention the reduction of pilot pressure by means of the pilot valve determines the pressure balance at the throttle valve spool and therefore the exact position of the throttle valve spool in the throttle valve, whereby the flow cross section is set according to operational or situation related conditions. Therefor, according to the invention, the reduction of the pilot pressure by means of the pilot valve is controllable depending on the rotational speed of the drive motor.

Thereby, all customary manners for the generation of a signal depending on the rotational speed for monitoring the pilot valve are covered by the inventive idea. This can be, for instance, the height of a pressure or a pressure gradient, being further exemplarily generated by a charge pump being driven by the transmission hydraulic pump. In the context of the invention, the signal depending on the rotational speed of the drive motor can be an electric, pneumatic, mechanic, hydraulic or another rotational speed-depending signal, whose signal strengths preferably increases with the increasing rotational speed of the drive motor or the transmission system pump. In the art, exemplarily, mechanic, pneumatic, hydraulic or electric or electro-magnetic operable pilot valves or pilot pressure reduction valves are used, which, exemplarily set against an adjustable counterforce—in the simplest case an adjustable spring force—the height of a pilot pressure reduction according to the change of signal strength and, therewith, the hydraulic power in coasting operation of a hydrostatic transmission in its return line downstream the throttle valve. However, a revision of the signal sequence, that means the reduction of signal strength with the rotational speed of the drive motor is encompassed by the inventive idea as well, as this is a measure being usual in the art for receiving a rotational speed-depending signal for controlling a pilot pressure reduction valve.

If, for instance, the hydraulic power being forwarded to the hydraulic pump and which power results from the support pressure in the return line and from the volumetric volume flow rate through the return line downstream of the throttle orifice is higher than the mechanical power capable to be forwarded to the drive motor, the throttle valve spool has to be shifted in the direction of reduction of the flow cross section, so that the drive motor will not overspeed. According to the invention this is achieved by the pilot pressure predetermined by the pilot valve. If the rotational speed at the drive motor increases, the pilot valve sets a lower pilot pressure, exemplarily, by means of an actuator, whereas the pressure balance at the throttle valve spool is disturbed and the throttle valve spool is shifted such that the flow rate cross section is lowered and the support pressure acting on the hydraulic pump is reduced until a force balance on both sides of the throttle valve spool is established again.

If the external load on the hydrostatic transmission in coasting operation is changed because, for instance, the slope, on which the hydrostatic driven work machine is located increases, the pressure and the hydraulic power in the return line upstream and, in a first instance, as well the support pressure downstream of the throttle valve raises. The increase of the support pressure raises the hydraulic force on the first front face of the throttle valve spool, whereby, with constant pilot pressure, the same is shifted such that the flow rate cross section of the throttle valve is reduced, by what the support pressure downstream of the throttle drops until pressure-/force balance on both front faces of the throttle valve spool is established again. In this operational example, in which the external load on the hydrostatic transmission increases, the pilot pressure remains preferably constant, because the operational speed of the drive motor must not increase, as the same was set already on its maximum admissible rotational speed due to the coasting operation. The throttle valve spool is hold in a new pressure balance, in which the flow rate cross section in comparison to the initial situation is lower. However, the support pressure in the return line downstream of the throttle valve is adapted to the hydraulic power, which can be forwarded to the drive motor by the hydraulic pump without passing its maximum admissible decelerating rotational speed. By the inventive method, as explained above, the support pressure is self-adapted or held as the increased pressure, for example due to a higher generated power by the hydraulic motor in coasting operation, is in fact shifting the throttle valve spool such that the flow rate cross section of the throttle valve, i.e. the throttle orifice is lowered, however, the support pressure and therewith the hydraulic power downstream after the throttle valve is maintained. This self-actuating regulation of the hydraulic power downstream of the throttle valve depicts another advantage of the inventive method compared with the known methods from the state of the art.

In the reverse case, if the rotational speed of the drive motor is lower than the maximum admissible drag rotational speed and more hydraulic power would be supportable at the drive motor, the opening forces on the second front face of the throttle valve spool are set to low and can be increased until the drive motor reaches its maximum admissible drag rotational speed. In this case by reduction of the pilot pressure reduction by what the pilot pressure and hence the force onto the second front face of the throttle valve spool increases, the throttle valve spool is shifted in direction of its first side and the flow rate cross section is augmented. By this the support pressure and the hydraulic power in the return line increase as well as the hydraulic force on the first front face of the throttle valve spool. This shifts until a force balance on both front faces of the throttle valve spool is reached again. So the rotational speed of the drive motor can be increased until its maximum admissible drag rotational speed in order to achieve maximum hydrostatic deceleration for the hydrostatic transmission without bringing the drive motor or the hydraulic pump in a range of rotational overspeed.

With the capability to position exactly the throttle valve spool in the throttle valve during the coasting operation, at every time the maximum available drag torque can be utilized and exploit to its maximum for decelerating the hydrostatic transmission, i.e. the hydraulic power in the return line downstream of the throttle valve can be adapted dynamically to changing operational parameters, i.e. the hydraulic power in the return line downstream of the throttle valve can be adapted to changing operational parameters by a suitable control of the height of the pilot pressure.

Hereby, it is advantageous that by optimum utilization of the maximum total drag power of the work machine for the deceleration of the hydrostatic transmission, less excessive power generated by the hydraulic motor in a coasting operation have to be transformed into heat. The power which cannot be supported mechanically at the drive motor is dominated. As excessive generated power by this not only cooling power is saved since also the used hydraulic fluid is protected, as this will be charged less by heat. The inventive method steps in only in the control of hydrostatic transmission during a coasting operation and does not influence the power created by the hydraulic pump during a drive or acceleration operation.

The inventive method further guarantees that the flow rate cross section of the throttle valve stays maximum for that hydraulic line, in which the throttle valve is arranged, hence, no throttling by the throttle valve occurs, if the hydraulic line, is a low pressure conducting hydraulic line, thus, for example, in the reversed coasting mode or in the non-reversed drive mode. This follows from the fact, that the low pressure in a closed system—on which the invention is based on—cannot be undercut and acts closing according to the invention as support pressure on the throttle valve. At the same time the opening pilot pressure for the throttle valve comprise at least the level of the low pressure and, hence, at least the level of the support pressure, thus being capable to hold, eventually with the help of a throttle valve spring the throttle valve spool in the throttle valve in its maximum open position, in which the flow rate cross section is maximal. Only if the hydraulic line, in which the throttle valve is arranged, is a high pressure line, the support pressure, is higher than the low pressure until which level the pilot pressure can be lowered maximally.

The same hydraulic line in which the throttle valve is arranged conducts high pressure, if the hydrostatic transmission is in the non-reversed coasting mode or in reversed drive mode. However, a pilot pressure reduction starts only, if a maximum admissible (drag) rotational speed is exceeded, which normally is not reached by the drive motor in the reverse drive operation. As long as the drive motor stays below the maximum admissible rotational speed limit in a coasting operation the pilot pressure, according to the invention, is not reduced and the pressures on both sides of the throttle valve spool are at least balanced, whereby, eventually, a throttle valve spring holds the throttle valve spool in the position, in which the flow rate cross section through the throttle valve is largest, what means that the resulting hydraulic force generated by the pilot pressure is equal or only slightly higher than the hydraulic force resulting of the support pressure. Hence, the requirement is fulfilled that a throttling of the drive power in the reversed drive mode of a hydrostatic transmission is unwanted and the whole hydraulic power in the reversed drive mode reaches the hydraulic motor, so also flow forces capable to displace the throttle valve spool out of his position in the maximum open position of the throttle valve and pilot volumetric flow rates of the hydraulic fluid can be avoided completely.

The inventive method for decelerating a hydrostatic transmission utilize in general and exemplarily the hydraulic pressure downstream of a throttle valve arranged in a hydraulic line (support pressure directed to the hydraulic pump), in order to conduct this support pressure on a first front face of a throttle valve spool adjusting the flow rate cross section of the throttle valve, therewith acting closing on the throttle valve—in a kind of self-locking effect. At the same time the inventive method use a pilot pressure being adjustable in its height, which can be provided in a controlled manner by a pilot valve and which pilot pressure acts on the opposite second front face of the throttle valve spool such that the throttle valve spool is hold in a kind of a pressure balance in a force balance against the force on the first front face. Thereby, the pilot valve is fed by the pressure in the return line upstream before or downstream after the throttle valve or another high pressure. In order that the hydraulic power in the hydraulic line downstream of the throttle valve corresponds to the maximum power being mechanically supportable at the drive motor during the whole coasting operation, the pilot pressure can be adjusted in its height according to operational or situation related conditions. Hence, the pilot pressure predetermine flexibly the balance of forces with which the throttle valve spool is held in its relative position in a throttle valve housing, what in turn determines flexibly the flow rate cross section and hence the support pressure downstream after the throttle. The pilot valve determines the height of the pilot pressure and thereby as well the hydraulic power being conducted to the drive mechanism of the hydraulic pump without generating another pilot volumetric flow rate of the hydraulic fluid. The so adjusted hydraulic power must not but should be, however, in coasting mode only such high that the drive motor driven by the hydraulic pump is not over-revved.

If the hydraulic power generated by the hydraulic motor in the reversed coasting mode and introduced into the return line is lower as the power being supportable on the drive motor by the hydraulic pump, according to the invention the pilot pressure is not reduced as the maximum admissible drag rotational speed of the drive motor is not reached. In this case the pilot pressure corresponds at least to the support pressure and the throttle valve spool is held by the pilot pressure and a throttle valve spring in such a position in which the flow rate cross section is being maximum. Thereby, the hydraulic pressure being present in the return line is capable to exert an opening as well as a closing force on the throttle valve spool of the throttle valve. In a preferred embodiment, both front faces of the throttle valve spool, on which the hydraulic pressure acts, are being equal in size, by what the hydraulic forces on both front sides being equal in height and the throttle valve spool is held in kind of a hydraulic balance. The throttle valve spool can be brought into an open position of the throttle valve exemplarily by a throttle valve spring. By the single side adjustability of the pressure acting in an opening manner on the throttle valve spool, the throttle valve can be adjusted in its flow rate cross section and, hence, the support pressure and the hydraulic power with which the hydraulic pump is driven for being mechanically supported by the drive motor can be adjusted flexibly and dynamically in order to use optimally the drag power present at the drive motor, without over-speeding the drive motor.

Preferably a controllable pilot valve is used for controlling the pilot pressure and, thereby, the throttle cross section, which, exemplarily, is fed by the support pressure in the return line downstream of the throttle valve. Hereto the adjustable pilot valve is, exemplarily, in dependency of the rotational speed of the drive motor operable mechanically, pneumatically, hydraulically or electrically by an actuator.

The control of the reduction of the pilot pressure can be designed generally such that a maximum excitation for instance a maximum energisation of a solenoid used as an actuator achieved a maximum or minimum pilot pressure reduction. Hereby, a minimum pilot pressure reduction corresponds to a non-reduction of the flow rate cross section of the throttle valve of the hydraulic return line and therefor to a unhindered flow rate, as it is desired for instance in drive mode of the hydrostatic transmission or as it is desired in decelerations, which do not cause damages at the hydraulic pump, at the drive motor and/or at the auxiliary drives. However, for the protection of the drive motor, the hydrostatic transmission and the machine operators the initial position of the pilot valve is preferably chosen such that, if the actuator is without any force, a maximum reduction of the pilot pressure occurs, with the result that in case of a breakdown of the actuator or the force actuating on the same during a coasting mode a throttling of the hydraulic pressure in the return line is achieved and thereby an over-speeding of the drive machine and/or the hydraulic pump of the hydrostatic transmission in coasting mode is avoided securely. Therefore, preferably a valve spool of the pilot valve is pre-stressed by a spring such that a maximum reduction of the pilot pressure conveyed to the pilot valve, to a minimum pilot pressure acting on the opening front face of the throttle valve spool is achieved. Herewith the opening forces of the throttle valve spool are reduced to a minimum and, in case of a breakdown of the actuator, the throttle valve stays closed in so far that the resulting support pressure in the return line leads to a hydraulic power downstream of the throttle valve which do not over-speed the drive motor. With the pilot pressure reduced maximally the throttle valve spool is shifted in closing direction as long as the support pressure downstream of the throttle valve has dropped to the (minimum) value of the pilot pressure. At the very least the pilot pressure and hence the flow rate cross section is reduced in this case insofar that the hydraulic power present in the return line after the throttle valve does not cause in any operational condition of a coasting operation damages on the working machine and, hence, no danger for human beings and/or machines are present.

In order that in case of a breakdown of the actuating device for the pilot pressure reduction of the reverse drive operation of the hydrostatic transmission is not influenced negatively, in particular, the application of a shuttle valve can be provided, which guarantees that no throttle effect occurs in the throttle valve. Therefore, the pilot valve is bypassed by suitable shifting of the shuttle valve, with which the shuttle valve opens a bypass line bypassing the pilot valve and conducting the reduced pilot pressure to the second front face of the throttle valve spool. At the same time, exemplarily, a connection line to the pilot valve or an outlet of the pilot valve is closed. The pressure preferably taken out of the high pressure conducting return line may then be conducted via the bypass line to the opening second front face of the throttle valve spool. Further, the shuttle valve is preferably designed such that the servo pressures used for controlling the hydraulic pump, that means used for displacing the hydraulic pump, operate the shuttle valve spool of the shuttle valve so that the shuttle valve spool opens or closes the bypass line conducting the pressure present in the return line and mirror-inverted interrupts or enables the hydraulic connection of the pilot valve to the throttle valve.

If, exemplarily, the hydraulic pump conveys during a driving operation hydraulic fluid under high pressure via the hydraulic line, in which the throttle valve is arranged, to the hydraulic motor, the direction of flow of the hydraulic fluid flow in the hydraulic line is different as the same hydraulic line would be a return line for hydraulic fluid under high pressure (coasting operation in opposite direction). This means that the hydraulic pump shows in these operational conditions different conveying directions for the conveyance of hydraulic fluid. These operational conditions are set commonly by the servo pressures displacing the hydraulic pump. These servo pressures can be conducted to a shuttle valve spool of the shuttle valve such that these servo pressures control the shuttle valve in a manner that a bypass line bypassing the pilot valve is opened if, corresponding to the conveying direction, the hydraulic line, in which the throttle valve is arranged, forms a forward line. If the pilot valve is bypassed, the pressure forces on both front faces of the throttle valve spool are balanced and the throttle valve spring arranged in the throttle valve holds the throttle valve spool in the position, in which the throttle valve is opened maximum.

The inventive method and the inventive device for decelerating a hydrostatic transmission controls or reduces, respectively, only in coasting mode of the hydrostatic transmission the pressure downstream of a throttle valve being arranged in the return line, in a controlled manner so that the hydraulic power conducted to the hydraulic pump corresponds to the power, which can be transmitted via the hydraulic pump to the drive motor as brake power. The inventive arrangement controls further the pressure being present downstream of the throttle valve such that the hydraulic power forwarded after the throttle valve corresponds to the motor brake power, with which the hydraulic pump is capable to support itself on the drive motor and, at the same time, on further consumers without over-speeding the drive motor or the hydraulic pump.

BRIEF DESCRIPTION OF THE DRAWINGS

In the following the design of an inventive hydrostatic transmission should be explained by the help of the attached Figures and, simultaneously, an embodiment for a throttle valve is depicted, with which a coasting operation of a hydrostatic transmission can be monitored with the result that said hydrostatic transmission can be decelerated without damaging the drive motor, the hydraulic pump or any other component of the work machine. However, the embodiments shown in the Figures, in particular, the pilot valves are mere by an example and do not limit the scope of protection of the inventive idea. It is shown in.

DETAILED DESCRIPTION

Figure 1:
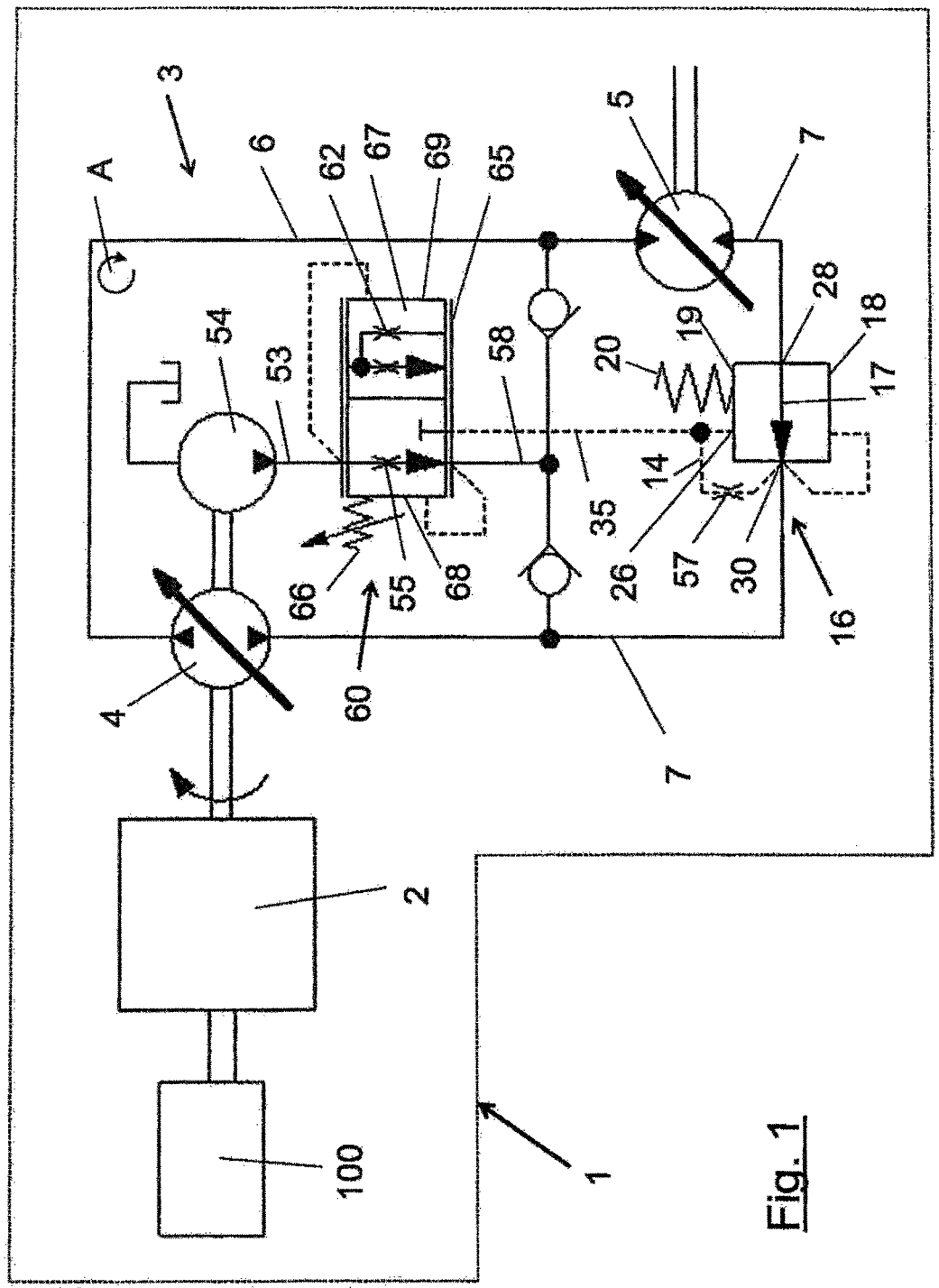
FIG. 1 schematically a hydraulic circuit diagram of a first embodiment of a hydrostatic transmission having a throttle valve arranged in a hydraulic line and being adjustable according to the invention.

FIG. 1 shows schematically a hydraulic circuit diagram for a first embodiment of a work machine 1, whose hydrostatic transmission 3 is capable of being slowed down or decelerated, respectively, according to the invention. Within the hydrostatic transmission 3 a hydraulic pump 4 being driven by a drive motor 2 and a hydraulic motor 5 are arranged in a closed hydraulic circuit. Mere exemplarily and representative for a possible plurality of auxiliary drives and consumers, which are being driven also in a coasting operation and having therefore an rotational reducing effect on drive motor 2, a consumer 100 is shown in FIG. 1 as a representative therefor.

The closed hydraulic fluid circuit is closed by a hydraulic line 6 being a supply line 6 in the exemplarily shown operational condition of FIG. 1 (flow rate direction clockwise; see arrow A) and by a return line 7 for hydraulic fluid towards the hydraulic pump 4. Mere exemplarily and for a better visuality, in the embodiment according to FIG. 1 only one throttle valve 16 is arranged in the hydraulic fluid return line 7 and can be controlled according to the inventive method. However, covered by the inventive idea, is also an arrangement of a second throttle valve in supply line 6 for decelerating the hydrostatic transmission in the other, reversed flow rate direction of the closed hydraulic fluid circuit. As already disclosed, hydraulic line 6 as well as hydraulic line 7, can be according to the operation condition of hydrostatic drive 3 and the two conveying directions of the hydraulic pump 7 be a supply line 6 towards the driving mechanism of hydraulic motor 5 or a return line 7 towards the driving mechanism of hydraulic pump 4. Thereby, according to the operational mode (drive mode or coasting mode) the corresponding hydraulic line conducts hydraulic fluid under high or low pressure. The shown symbols in FIGS. 1, 2, 3 and 6 for hydraulic pumps and hydraulic motors correspond schematically to the driving mechanism of hydraulic pumps or hydraulic motors and not to a hydraulic pump or to a hydraulic motor assembly group, as these are mounted in praxis in working machines. Particularly, the lines, valves and devices shown in FIGS. 1 to 6 can be integrated completely or partially in hydraulic pump—or hydraulic motor assembly groups, for instance within the housings of the same.

In the hydrostatic transmission 3 according to FIG. 1 in hydraulic line 7 a throttle valve 16 is arranged, whose inlet 28 is feed in coasting operation with hydraulic fluid under high pressure coming from hydraulic motor 5 and from whose outlet 30 hydraulic fluid under support pressure is conducted to hydraulic pump 4. The support pressure being present at outlet 30 comprises a throttle valve closing effect on a first front face 18 of a throttle valve spool 17 in throttle valve 16. The same pressure is guided to a pilot pressure line 35 via a connecting line 14, in which??? an orifice 57 arranged therein and which is being connected to a second front face 19 of throttle valve spool 17, on which the pilot pressure has a throttle valve opening effect. A throttle valve spring 20 pushes the throttle valve spool 17, if hydraulic pressure balance is given on both front faces 18 and 19 of the throttle valve spool 17, against a stop 29 inside the throttle valve housing 24 (see FIG. 3), whereby the throttle valve spool 17 releases the maximum flow rate cross section, and hydraulic fluid can flow through throttle valve 16 nearly without any resistance. Pilot pressure line 35 is connected at its other end with a proportional throttle valve 60, via which the pressure being present in pilot pressure line 35 can be reduced or depressurized, respectively. Thereby in the embodiment according to FIG. 1, the pressure present at outlet 30 determines the maximum pilot pressure. In other embodiments, pilot pressure line 35 can be fed also from high pressure upstream of throttle valve 16 or another high pressure comprising a suitable high pressure level in order to hold throttle valve spool 17 against the support pressure in a kind of pressure balance.

The proportional throttle valve 60 used as pilot valve according to the embodiment shown in FIG. 1 is an adjustable two-position three-way valve comprising a proportional throttle valve spool 67, whose position in a proportional throttle valve housing 65 is adjustable by suitable force exertion on its first front face 68 and its second front face 69. The proportional throttle valve 60 is connected via a charge pressure line 53 to a charge pump 54. Within the charge pressure line 53 a metering orifice 55 is arranged impounding the hydraulic fluid flow rate created by charge pump 54 to a charge pressure. It can be seen easily by a person skilled in the art that the arrangement of the proportional throttle valve 60 and the metering orifice 55 can be implemented in every other hydraulic line of a work machine as long as the hydraulic fluid flow rate conducted by the hydraulic line is depending on the rotational speed of the drive motor and/or the rotational speed of the hydraulic pump. These criteria are fulfilled for instance by the mentioned charge pressure line 53 conducting hydraulic fluid, whose volumetric flow rate is generated depending on the rotational speed of a charge pump 54, whereby the charge pump 54 commonly is coupled by a fixed transmission ratio to hydraulic pump 4.

According to the embodiment shown in FIG. 1 the pressure being present upstream before the metering orifice 55 in charge pressure line 53 is conducted to the second front face 69 of proportional throttle valve spool 67 effecting there an opening force on the proportional valve spool 67. On first front face 68 of proportional throttle valve spool 67 an adjustable proportional throttle valve spring 66 and a pressure arising in a filling line 58 downstream of metering orifice 55 are acting closing on the proportional throttle valve. As, in general, the force of the proportional throttle valve spring 66 during the operation of work machine 1 is not changed, the position of proportional throttle valve spool 67 in proportional throttle valve housing 65 depends on the pressure difference generated via metering orifice 65. By means of the position of proportional throttle valve spool 67 in proportional throttle valve housing 65 a flow rate cross section between the pilot pressure line 35 and charge pressure line 53 can be opened or closed in a controlled manner. As the proportional throttle valve spring 66 arranged at the first front face 68 acts closing on the proportional throttle valve, the proportional throttle valve 60 only opens, if the pressure difference passes a determined value given by the proportional throttle valve spring 66. According to the invention, this occurs if drive motor 2 reaches its maximum admissible drag rotational speed.

Therefor it is necessary that the pressure gradient or the pressure difference on both front faces 68 and 69 of the proportional throttle valve spool 67 depends in its height from the rotational speed. This is achieved by metering orifice 55, as the height of the pressure before the metering orifice 55 depends on the rotational speed of charge pump 54 and its volumetric flow rate generated thereby. That means, that with increasing the rotational speed of drive motor 2 and of charge pump 54 connected with the same, the pressure difference to the pressure in filling pressure line 58 increases, and hence the opening force on proportional throttle valve spool 67 increases quicker as the closing force on proportional throttle valve 60 caused by the pressure in filling pressure line 58. The rotational speed dependency of the pressure before metering orifice 65 results from the fact that the charge pump is connected by a fixed transmission relation directly and mechanically to the drive motor or indirectly via hydraulic pump 4 to drive motor 2. Hence, the pressure gradient over metering orifice 55 generated by charge pump 54 depends directly from the rotational speed of drive motor 2 or hydraulic pump 4, respectively. According to the invention, in the embodiment shown in FIG. 1, this rotational speed depending pressure gradient is used as hydraulic signal for the proportional control of the flow rate cross section of proportional throttle valve 60, whereby proportional throttle valve 60 only frees a flow rate cross section, if a pressure gradient predetermined by the proportional throttle valve spring 66 is exceeded, what further, according to the invention, is reached, if the drive motor 2 is at its maximum admissible drag rotational speed. Above this maximum admissible rotational speed of drive motor 2, the proportional throttle valve spool 67 is shifted proportionally to the increase of the pressure gradient such that a connection cross section between the pilot pressure line 35 and the charge pressure line 53 is opened proportionally with the increase of the rotational speed, what results in that the pressure present in pilot pressure line 35 can be depressurized in a controlled manner via charge pressure line 53, what means, can be reduced proportionally. Throttle valve 16 is controlled according to the invention in its flow rate cross section in that way that the hydraulic power conducted via return line 7 to hydraulic line 4 is just that high that drive motor 2 is held at its maximum admissible rotational speed and being protected of over-speeding.

As long as drive motor 2 has not reached its maximum admissible drag rotational speed or another predefined limit rotational speed, proportional throttle valve 60 remains closed, whereby a pressure force balance between the support pressure and the pilot pressure is present at throttle valve spool 17 and whereby throttle valve 16 is in its maximum open position, in which hydraulic fluid in return line 6 is able to flow unhindered from hydraulic motor 5 to hydraulic pump 4.

In alteration of the embodiment shown in FIG. 1, an electronic generated force depending on the rotational speed of drive motor 2 or hydraulic pump 4 could be used for the controlled displacement of proportional throttle valve spool 67 instead of the pressure difference over metering orifice 55. However, every other kind of generation of a rotational speed depending force on proportional throttle valve spool 67, be it mechanically, pneumatically or in any other hydraulic or electric manner is covered by the inventive idea.

Figure 2:
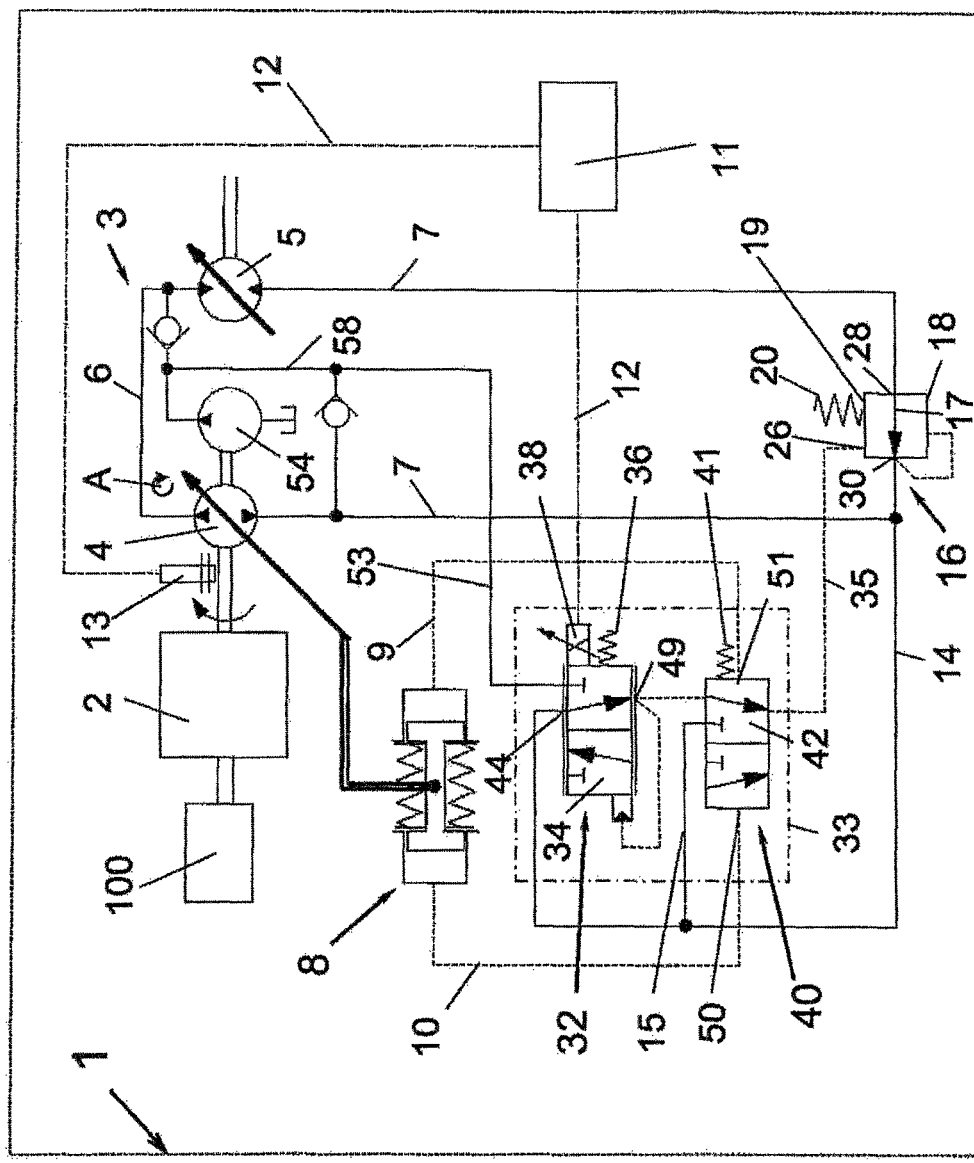
FIG. 2 schematically a hydraulic circuit diagram of a second embodiment of a hydrostatic transmission having a throttle valve arranged in a hydraulic line and being adjustable according to the invention.

In FIG. 2 another embodiment for a work machine 1 is shown, whose hydrostatic transmission could be slowed or decelerated according to the inventive method. Thereby same assembly groups and elements are denoted with the same reference numerals as used in the embodiment according to FIG. 1. In contrast to the embodiment of FIG. 1, which exemplarily throttles the pilot pressure by means of a rotational speed depending hydraulic pressure, in the embodiment according to FIG. 2 a controlled pressure reduction of the support pressure to a pilot pressure takes place, which is conducted to the second front face 19 of throttle valve 16, as it is done in the embodiment according to FIG. 1. This support pressure reduction to a pilot pressure is achieved according to the embodiment in FIG. 2 exemplarily by means of a rotational speed depending electric signal. The pilot pressure reduction valve 32 used as pilot valve is controlled via a rotational speed depending signal and is actuated by means of a rotational speed depending force resulting thereof for achieving a pressure reduction.

In the embodiment of FIG. 2 a further inventive manner should be shown exemplarily, how the pilot pressure having an opening effect on throttle valve spool 17 can be reduced, if drive motor 2 exceeds its admissible drag rotational speed. In this embodiment, the pilot pressure reduction valve 32 is used in way of a pressure control valve achieving the re-conduction of the more or less support pressure reduced as pilot pressure to throttle valve spool 17. The used according to the embodiment of FIG. 1 combination of a fix orifice 57 in connection line 14 is changed in embodiment 2 to a rotational speed controlled pilot pressure reduction valve 32. Therewith the pressure introduced into pilot pressure line 35 can be reduced, if necessary to adapt the force relationships at throttle valve spool 17 according to the invention, and in order that drive motor 2 in coasting operation could be held at its maximum admissible drag rotational speed and simultaneously an over-speeding of the drive motor 2 is avoided.

Therefor, a connection line 14 sidelines between the throttle valve 16 and the hydraulic pump 4 conducting the support pressure downstream of the throttle valve 16 to a pilot pressure reduction valve 32 adjusting the pilot pressure, if necessary. If the shuttle valve 40 is in a first switch position the pilot pressure is conducted over shuttle valve 40 to second front face 19 of throttle spool 17. As initially mentioned already, the pilot pressure reduction valve 32 can be supplied also with the pressure upstream of throttle valve 16 or with any other high pressure being available at the work machine. The shuttle valve 40 used in this embodiment serves for example for deactivating throttle valve 16 and, in particular, is provided for the reverse drive operation of the work machine and, hence, not invention-relevant for the implementation of the invention, since it is a safety extension of the inventive idea with regard to reversed drive operations of the hydrostatic drive 3, in particular, with regard to hydraulic pump 4.

In a first switch position shuttle valve 40 connects the outlet 49 of pilot pressure reduction valve 32, whereby the pilot pressure being present at outlet 49 of the pilot pressure reduction valve 32 is conducted to a second front face 19 of a double sided throttle valve spool 17 capable to be forced with hydraulic fluid under pressure. The pilot pressure exerts a force on throttle valve spool 17, which increases the flow rate cross section through throttle valve 16. Further, a throttle valve spring 20 acts on the second front face 19 of throttle valve spool 17 and exerts an opening force on the throttle valve 16, too.

On the first front face 18 of throttle valve spool 17, the support pressure present downstream of the throttle valve 16 in return line 7 acts directly on throttle valve spool 17 with a force closing the throttle valve 16, as throttle valve spool 17 is connected with its first front face 18 to outlet 30 of throttle valve 16. In a preferred embodiment, the sums of the effective pressure faces at the first front face 18 and at the second front face 19 of throttle valve spool 17 are of equal size (see FIG. 3) so that, if the hydraulic fluid pressures on both front faces 18 and 19 of throttle valve spool 17 are of the same height, throttle valve spring 20 shifts the throttle valve spool 17 in the position, in which the throttle valve 16 is in its complete open position and is hold there by the throttle valve spring 20 against flow forces, eventually present. If, for instance, the pressure at outlet 30 of throttle valve 16 raises, throttle valve spool 17 is shifted in direction of his closed position against the hydraulic force of the pilot pressure on the first front face 18 of throttle valve spool 17 and the force of throttle valve spring 20, as long as this is permitted by pilot pressure reduction valve 32. By the shifting of the throttle valve spool 17, the flow rate cross section through throttle valve 16 is reduced; hence, the pressure at outlet 30 drops. The adjustment of the height of the pilot pressure by means of the pilot pressure reduction valve 32 will be explained in detail below.

In a second switch position of the shuttle valve 40, the support pressure is conducted non-reduced via a bypass line 15 bypassing the pilot pressure reduction valve 32 and via pilot pressure line 35 to second front face 19 of throttle valve spool 17 of throttle valve 16. In this switch position of shuttle valve 40, the hydraulic forces on both front faces 18 and 19 of the throttle valve spool 17 are balanced and the throttle valve spring 20 pushes the throttle valve spool 17 in the maximum open position of the flow rate cross section of throttle valve 16. In this operational condition hydraulic fluid can flow unhindered from hydraulic motor 5 to hydraulic pump 4, what, exemplarily in desired in a reversed operation for both operational modes. In this cases, damages due to over-speeding of hydraulic pump 4 and/or the drive motor 2 are excluded. For shifting of shuttle valve 40, the same is connected via two servo pressure lines 9 and 10 with a servo control unit 8 of hydraulic pump 4. The servo pressures inside the servo pressure lines 9 and 10 correspond to the pressures being present in the servo control unit 8 for adjusting the conveying volume of hydraulic pump 4. The direction of conveying and the amount of conveying volume of hydraulic pump 4 are determined by a hydraulic control unit, whose function principle is commonly known in the art and hence, will not be shown here or explained in more detail.

In the operational direction suitable for the description of the invention of the hydrostatic transmission 3 according to FIG. 2, hydraulic fluid flows with direction of flow clockwise through hydraulic lines 6 and 7. Hydraulic pump 4 is displaced to one predefined side. The higher servo pressure causing this displacement is conducted according to the embodiment shown in FIG. 2 exemplarily via servo line 9 to a shuttle valve spool 42 of shuttle valve 40 switching the shuttle valve 40 such that the more or less reduced pressure being present at the outlet 49 of pilot pressure reduction valve 32 is conducted via a pilot pressure line 35 to second front face 19 of throttle valve spool 17.

As long as the hydrostatic transmission 3 is in a non-reversed drive operation (direction of flow clockwise) the flow rate cross section through throttle valve 16 should be maximum in order that the hydraulic motor 5 is able to return completely the hydraulic fluid volumetric flow rate received from hydraulic pump over return line 7—in this operational condition low pressure conducting line. This means, the hydraulic fluid pressures on both front faces 18 and 19 of the throttle valve spool 17 have to correspond to the low pressure at the hydraulic motor side in return line 7 before throttle valve 16, in order that throttle valve 16 is in its maximum open position. As the pilot pressure cannot fall under the level of the low pressure in a hydrostatic transmission with closed hydraulic fluid circuit, the pilot pressure must be at least such high. Therefore, at throttle valve spool 7 a pressure balance is present and, according to the invention, throttle valve 16 is in its maximum open position. Hereby, the low pressure is conducted via a connection line 14 to pilot pressure reduction valve 32 and via a pilot pressure line 35 non-reduced to the second front face 19 of throttle valve spool 7, whereby the pilot pressure automatically corresponds to the support pressure (low pressure) at outlet 30 of throttle valve 16, which in turn corresponds to the pressure upstream of throttle valve 16. Preferably, for adjusting/activating of the pressure reduction, in a non-reversed drive operation an actuator 38 located at pilot pressure reduction valve 32 is energized such that a pressure reduction even then does not occur, if the hydrostatic transmission 3 changes from the non-reversed driving mode in the non-reversed coasting mode, in order to achieve a smooth shock-free transition into the coasting mode without abrupt braking.

If the hydrostatic transmission 3 changes his way of operation and changes into the coasting mode, whereby the direction of flow of the hydraulic fluid remains constant—clockwise rotation according to FIG. 2—the prefixes of the servo pressures in servo control unit 8 does not change, that means that shuttle valve 40 remains in the position mentioned before. However, the pressure present in return line 7 on both sides of throttle valve 60 increases. In order that the support pressure after the throttle valve 16 in return line 7 together with the hydraulic fluid volumetric flow rate does not present a hydraulic power which cannot be supported on the drive motor via hydraulic pump 4 mechanically, according to the invention, the pressure present at outlet 30 downstream after the throttle valve 16 is reduced by throttle valve 16 on a value corresponding to the hydraulic power, which can be supported on drive motor 2 of work machine 1 maximally at this moment of operation. By the means of actuator 38 the support pressure conducted via connection line 14 to pilot pressure reduction valve 32 can be reduced in that actuator 38 energizes a pilot pressure reduction valve spool 34 such that the pressure in connection line 14 is reduced by pilot pressure reduction valve 32. Thereby, the pilot pressure in pilot pressure line 35 drops and also the opening hydraulic force on second front face 19 of throttle valve spool 17. The from now on higher closing force on first front face 18 of throttle valve spool 17, which is caused by the support pressure at outlet 30 of throttle valve 16, is capable to close the flow rate cross section of throttle valve 16. However, thereby, the support pressure at outlet 30 of throttle valve 16 goes down and the closing hydraulic force on first front face 18 of throttle valve spool 17 goes down. This occurs as long as on both front faces 18 and 19 of throttle valve spool 17 establish a new force balance built up by the reduced hydraulic pressure forces and the throttle valve spring force, whereby the throttle valve spool 17 is arranged in a new position within the throttle valve, in which the same closes the throttle cross section a little bit more.

By controlling the pilot pressure reduction valve 32 by the means of throttle valve 16 which determines the height of the pilot pressure or with the actuator 32 arranged there, the support pressure being guided to hydraulic pump 4 in the non-reversed coasting mode of the hydrostatic transmission 3 can be reduced, in order that the hydraulic power being set downstream in hydraulic line 7 corresponds to the maximum power which can be forwarded mechanically from hydraulic pump 4 to drive motor 2 as maximum deceleration power without over-speeding drive motor 2. The exceeding generated power of hydraulic motor 5 in coasting mode, which cannot be transmitted from hydraulic pump 4 to drive motor 2 is transformed to heat at throttle valve spool 17. If the hydraulic fluid volumetric flow rate from hydraulic motor 5 to hydraulic pump 4 is bigger than the one the hydraulic pump 4 can receive, the exceeding hydraulic fluid volumetric flow rate may be transformed into heat, exemplarily by HD-pressure relieve valves, whose feed line exemplarily split off upstream of throttle valve 16 from hydraulic line 7 (not shown in the Figures as commonly known in the art).

If the conveying direction of hydraulic pump 4 is changed, also the pressure relations in servo control unit 8 and therewith in servo lines 9 and 10 are changed. The shuttle valve 40 is brought into its other second switch position, in which the support pressure present at outlet 30 of throttle valve 16 is conducted via the bypass line 15 directly and unreduced to pilot pressure line 35, whereby, at the same time, the outlet 49 of pilot pressure reduction valve 32 is closed by shuttle valve 40. Pilot line 35 conducts in this manner the support pressure non-reduced to the second front face 19 of throttle valve spool 17 and hence, a pressure force in balance at throttle valve spool 17 is given and, as already mentioned above, throttle valve spring 20 moves throttle valve spool 17 in the position, in which throttle valve 16 comprises its maximum flow rate cross section.

Figure 3:
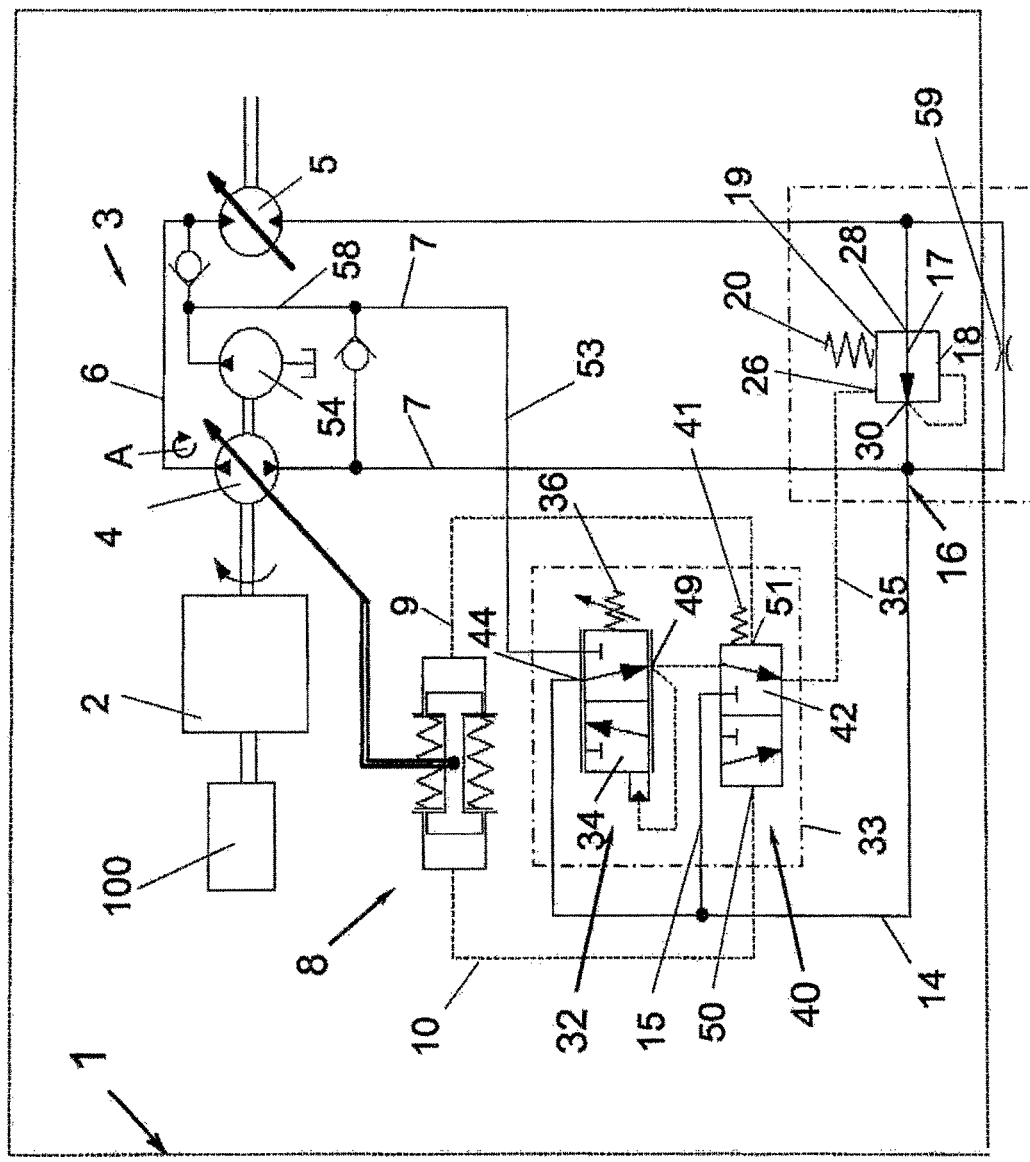
FIG. 3 schematically a hydraulic circuit diagram of a third embodiment of a hydrostatic transmission having a throttle valve arranged in a hydraulic line and being adjustable according to the invention.

With FIG. 3 a hydraulic circuit diagram of a third embodiment of a hydrostatic transmission according to the invention with an adjustable throttle valve arranged in a hydraulic line is shown. The control of throttle valve 16 and the pressurization of throttle valve spool 17 on its first front face 18 by the support pressure and on its second front face 19 by a pilot pressure correspond hereby to the embodiments of FIGS. 1 and 2. The adjustment of the height of the pilot pressure, in particular, the reduction of the support pressure to a pilot pressure may be performed hereby with a pilot pressure reduction valve 32 according to FIG. 2, however, in the embodiment according to FIG. 3 an operational speed proportional actuation is waived. Therewith, actuator 38, rotational speed sensor 13, electric connection line 12 and control unit 11 of the embodiment according to FIG. 2 can be omitted. By doing this, it is achieved that the arrangement according to the invention is managed with less parts, however, it must be accepted that the pilot pressure reduction is not depending on the rotational speed any longer. If, as shown in FIG. 3, only one pilot pressure reduction valve spring 36 acts opening on pilot pressure reduction valve spool 34 of pilot pressure reduction valve 32, the pilot pressure reduction valve 32 closes, if a fixed predefined pressure limit at outlet 30 of throttle valve 16 is exceeded.

Below this predetermined pressure limit the pilot pressure reduction valve spring 34 holds the pilot pressure reduction valve 32 in its maximum open position. In FIG. 2 as well as in FIG. 3, a pilot pressure reduction valve 32 is shown in its maximum open position, in which no reduction of the support pressure occurs, which is supplied to the pilot pressure reduction valve 32 via connection line 14.

According to invention in this embodiment also, a pilot pressure reduction is achieved, if exceeding a threshold value, in this case the maximum admissible pressure limit downstream after the throttle valve 16 is exceeded. At the same time, this limit pressure determines the maximum hydraulic power with which the hydrostatic transmission 3 according to FIG. 3 can be supported on the drive motor 2 mechanically. This limit pressure is maintained constant by the inventive method in the non-reversed coasting mode inside of hydraulic line 7 downstream of throttle valve 16 as long as the pressure upstream before throttle valve 16 is higher than the predefined pressure limit. With this solution also, a pilot volumetric flow rate is omitted, as the reduction of the pilot pressure acting on the second front side 19 of the throttle valve spool 17 does not occur via a pressure relieve valve, which depressurizes a pilot volume in the moment a pressure limit is exceeded, normally to an area with low pressure, for instance to a tank, whereby the pilot volume is lost for the working circuit of work machine 1 (see DE 10 2004 030 045 B3).

For improving of the use of the brake power of drive motor 2 a bypass orifice 72 which raises the support pressure, if at low volumetric flow rate and closed throttle valve 16 the pressure gradient is getting lower.

Figure 4:
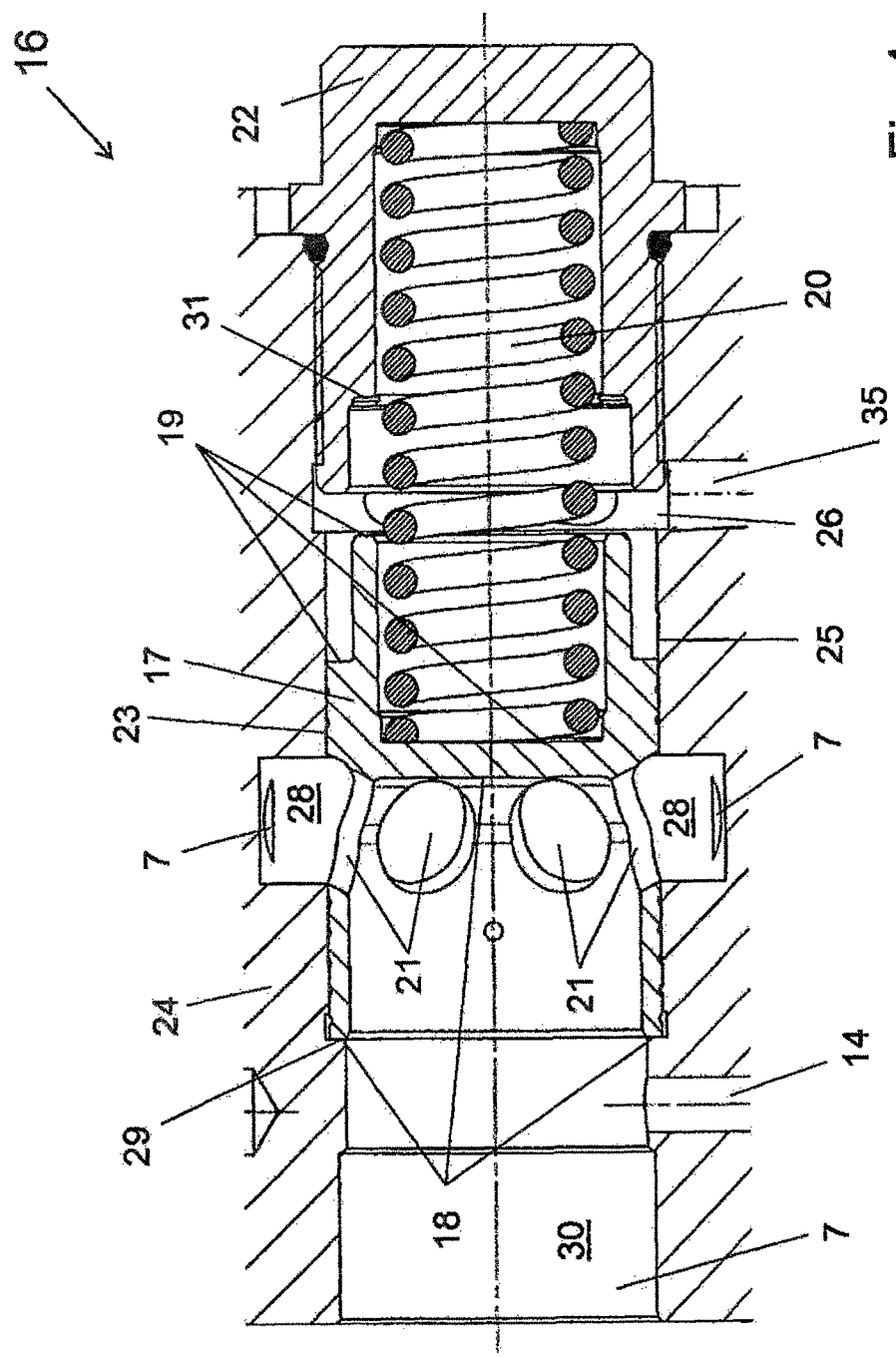
FIG. 4 a preferred embodiment of a throttle valve being operable according to the invention.

FIG. 4 is a preferred embodiment of a throttle valve 16 which is fixed in a throttle valve housing 24 by means of a plug screw 22. Throttle valve spring 20 pushes throttle valve spool 17 in direction of the maximum open position of throttle valve 16, in which position the throttle valve spool 17 abuts against a stopper 29. This valve position is shown in FIG. 4. Throttle valve spool 17 being pressurizeable on both sides with pressure fluid, is arranged displaceable in a cylindrical bore 25 in throttle valve housing 24 and comprise on a second front face 19 pressure effective surfaces facing to plug screw 22 and transverse to the longitudinal direction of the cylindrical bore 25 which, if energized with pressure, shifting the throttle valve spool 17 in direction of the open position of throttle valve 17, in which the flow rate cross section openings 21 are liberated maximum. Hereby, the surfaces hydraulically effective on the second front face 19 are sealed with respect to the flow rate cross section openings 21 by the means of sealing faces 23. The sealing or guiding faces 23, respectively, separates the first front face 18 of throttle valve spool 17 from the second front face 19. On the first front face 18 those surfaces are arranged which, being effective for hydraulic pressure forces, shift the throttle valve spool 17 within the throttle valve housing 24 in a direction in which the flow rate cross section openings 21 are closed. At the position of the throttle valve housing 24, in which the flow rate cross section openings 21 are in the fully opened position of throttle valve 16, for instance, a ring shaped inlet 28 for hydraulic fluid coming from hydraulic motor 5 is located. The outlet 30 of throttle valve 16 is located in the throttle valve 16, shown exemplarily in FIG. 2, at the cup-shaped first front face 18 of throttle valve spool 17 and disembogues in hydraulic line 7. From hydraulic line 7 the connection line 40 splits off conducting the brake pressure present at outlet 30 to pilot pressure reduction valve 32 (see FIG. 2). From pilot pressure reduction valve 32 via pilot pressure line 35 hydraulic fluid under pilot pressure is conducted to inlet 26 of throttle valve 16.

As it could be seen easily in FIG. 4, the support pressure being present at outlet 30 of throttle valve 16 acts on the valve-closing surfaces arranged at the first front face 18 of throttle valve spool 17, whereby the pilot pressure which is conducted via inlet 26 into bore 25 in throttle valve housing 24 causes an opening force on the throttle valve spool 17 by exerting pressure onto the perpendicular to the longitudinal axis of throttle valve 16 projected surfaces at the second front face 19 of throttle valve spool 17.

As apparent from FIG. 4, in the exemplarily throttle valve 16 shown there, the pressure-effective faces being orthogonal in projection to the longitudinal axis are of the same size, as for both front faces 18 and 19 of throttle valve spool 17 prevail the same diameter of throttle valve bore 25. Hence, the pressure forces on both front faces 18 and 19 of the throttle valve spool 17 show the same value, if the pilot pressure at inlet 26 corresponds to the support pressure at outlet 30. However, the hydraulic forces are of opposite directions facing each other. This neutralization of hydraulic forces is present in the position shown in FIG. 4, whereby the throttle valve spring 20 shifts the throttle valve spool 17 into the maximum open position at stopper 29 of throttle valve 16. Throttle valve spring 20 holds the throttle valve spool 17 in this position at stopper 29 even against flow rate forces from the hydraulic fluid flow rate, especially, if the hydraulic fluid flows from outlet 30 to inlet 28.

It is further apparent of FIG. 4 that, if the pilot pressure is reduced due to a demand of pilot pressure reduction valve 32 (see FIG. 2) and the pressure difference at the front faces 18 and 19 of throttle valve spool 17 is bigger than the force of throttle valve spring 20, throttle valve spool 17 is shifted on the drawing layer to the right, whereby the flow rate cross section openings 21 are reduced, as long as a new force balance on both front faces 18 and 19 of the throttle valve spool 17 is present. Hereby, the valve-closing pressure force on the first front face 18 holds the balance against the valve opening forces on the second front face 19 caused by the pilot pressure and the force of throttle valve spring 20. Throttle valve spool 17 is brought thereby into a according to FIG. 4 different position, in which the flow rate cross section openings 21 are closed further. Hence, the flow rate cross section through throttle valve 16 is reduced and the support pressure at outlet 30 decreases.

It can be seen well from FIG. 4 that by reduction of the pilot pressure being conducted via pilot pressure line 35 from pilot pressure reduction valve 32 to inlet 26 of throttle valve 16, throttle valve spool 17 is shifted in the drawing plane to the right, until he has reached a stopper 31 at the plug screw. The flow rate cross section openings 21 comprise in this position the lowest opening cross section. Throttle valve spool 17 has reached the closed position of throttle valve 16. With commonly appearing operational parameters for a work machine in coasting mode throttle valve spool 17 in throttle valve 16 rarely will be in the closed position rather than being hold by the equal forces on both front faces 18 and 19 of throttle valve spool between the open and the closed position in a kind of pressure balance.

In the maximum open position of throttle valve 16 throttle valve spool 17 abuts against stopper 21 in throttle valve housing 24, being in the position in which the flow rate cross section openings are largest or, respectively, completely opened in order to not hinder the flow rate through hydraulic line 7 and not to lower the hydraulic power to be transmitted or not to lower the hydraulic fluid volume flow rate to be returned.

Figure 5:
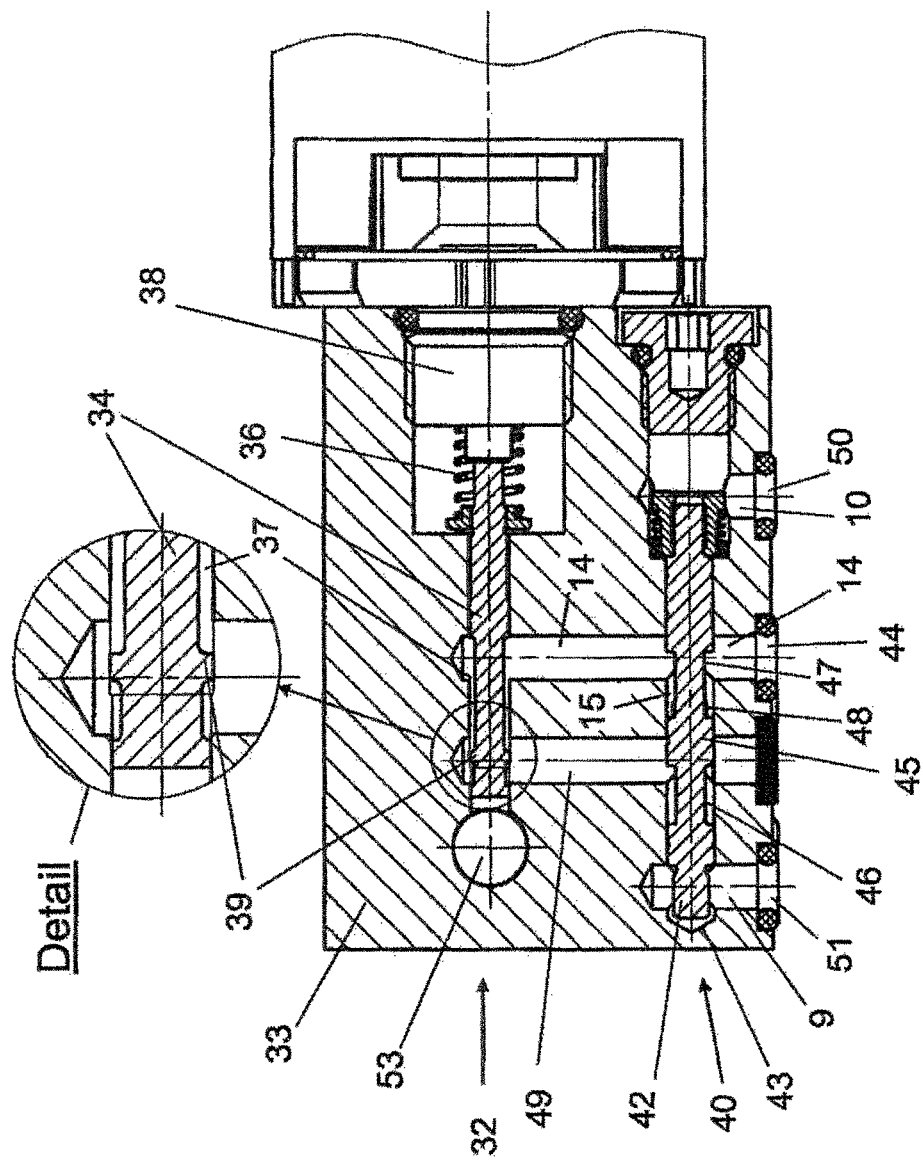
FIG. 5 a preferred embodiment of a pilot pressure reduction valve as pilot valve with an integrated shuttle valve for actuating the throttle valve according to FIG. 4.
Figure 6:
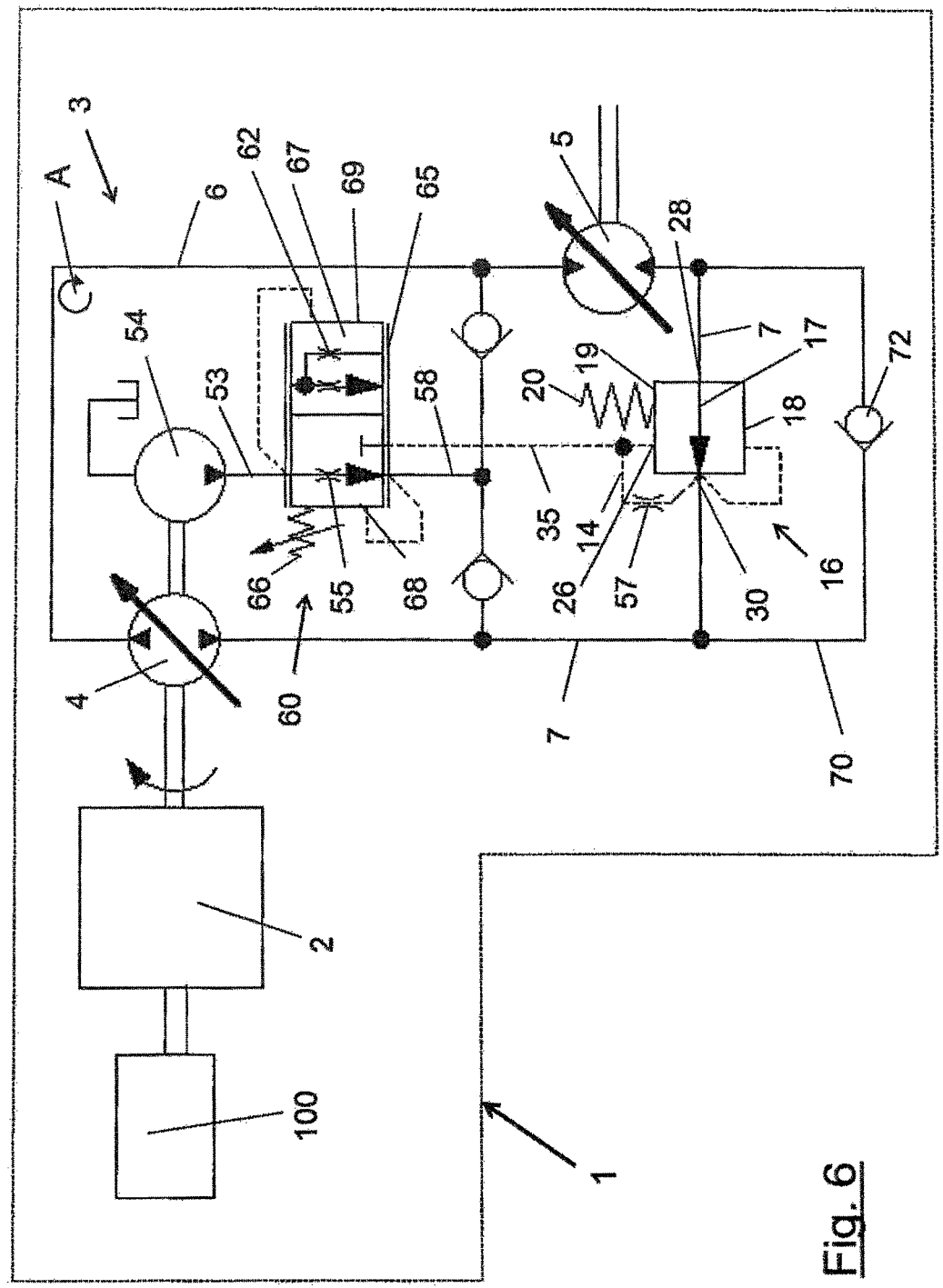
FIG. 6 the embodiment according to FIG. 1 with an additional bypass line for increasing the operational reliability.

In FIG. 5 a shuttle valve 40 is shown in a valve house 33 also common for the pilot pressure reduction valve 32. Shuttle valve 40 can be used for providing protection of the inventive method in the reversed drive mode and, at the same time, the inventive pressure reduction can be circumvented in operation directions of a work machine in which the hydraulic fluid flow rate circulates against the clockwise rotation according to the hydrostatic transmission 3 shown in FIGS. 2 and 3. In these operation directions throttle valve 16 should show the maximum flow rate cross section and should not hinder the flow rate through hydraulic line 7. This is achieved in the preferred embodiment of throttle valve 16 as depicted exemplarily in FIG. 4, in that the hydraulic pressure forces on both front faces 18 and 19 of throttle valve spool 17 are of the same height whereby throttle valve spring 20 brings the throttle valve spool 17 into the maximum open position. For this, shuttle valve 40 can close the outlet 49 of pilot pressure reduction valve 32 towards the pilot pressure line 35 and opens a bypass line 15 bypassing the pilot pressure reduction valve 32 and conducting the support pressure from outlet 30 of throttle valve 16 non-throttled to second front face 19 of throttle valve spool 17. Hence, both hydraulic pressure forces are being balanced due to pressure equality on both front faces 18 and 19 of throttle valve spool 17, whereby throttle valve spring 20 can shift throttle valve spool 17 towards stopper 29 in throttle valve housing 24. The throttle valve 16 is opened maximum (see FIG. 4).

As already described above, shuttle valve 40 is shifted preferably by the servo pressures which also effects the displacement of hydraulic pump 4 in its conveying- or swallowing capacity. For this shuttle valve 40 comprises an inlet 50 and an inlet 51 for each of the servo pressures of servo lines 9 and 10. The bigger one of the two servo pressures determines, under consideration of the force of shuttle valve spring 41, a position of shuttle valve spool 42 in shuttle valve bore 43 and opens or closes the bypass line 15 or, at the same time, opens or closes outlet 49 of pilot pressure reduction valve 32.

The shuttle valve 40 shown in FIG. 5 is in the second position provided for the reverse mode, in which the servo pressure present in servo line 10 shifts the shuttle valve spool 42 in the drawing plane to the left, in which the shuttle valve spool 22 by means of a mid-shoulder 45 on shuttle valve spool 42 closes outlet 49 of pilot pressure reduction valve 32, whereby, at the same time, a bypass line 15 via an opening 48 towards pilot pressure line 35 is unblocked. The opening 48 towards pilot pressure line 35 lies in the drawing plane of FIG. 5 perpendicular behind the right recessed area 47 of shuttle valve spool 42 in shuttle valve bore 43. The opening 48 of pilot pressure line 35 conducts, according to the valve position shown in FIG. 5, the support pressure being present at outlet 30 of throttle valve 16 and at inlet 44 of valve housing 33 via the bypass line 15 non-throttled to the second front face 19 of throttle valve spool 17. In this second position of shuttle valve 40, which is deviating from the first position being shown schematically in FIGS. 2 and 3, the hydrostatic transmission 3 is in an operation condition in which the direction of flow of the hydraulic fluid in the closed hydraulic circuit is opposite to the clockwise rotation, that means opposite to the direction of flow shown in FIG. 2.

If the servo pressures and hence the direction of conveying of the hydraulic pump 4 and hence the direction of flow of the hydraulic fluid are changing it results that the servo pressure at port 51 of servo line 9 at shuttle valve 40 is higher than the servo pressure at port 50 of the shuttle valve 40 for servo line 10. The shuttle valve spool 42 is brought spring-supported into the first position, in which shuttle valve spool 42 is completely shifted towards the right. This position corresponds to what is shown in FIG. 2. By shifting the shuttle valve spool 42 in the drawing plane of FIG. 5 towards the right the 45 blocks bypass line 15 and the recessed area 46 on the left of mid-shoulder 45 on shuttle valve spool 42 liberates opening 48 towards pilot pressure line 35. In this position of shuttle valve 40 the support pressure coming from outlet 30 of throttle valve 16 is conducted via entrance 44 at valve housing 33 over the right blind bore of connection line 14 towards the pilot pressure reduction valve 32. By means of pilot pressure reduction valve bore 37, in which a pilot pressure reduction valve spool 34 is arranged, the pressure alongside the left recessed area 46 of shuttle valve spool 42 is conducted forward pressure reduced towards opening 48 of pilot pressure line 35, from where it acts on the second front face 19 of throttle valve spool 17.

By suitable displacement of the pilot pressure reduction valve spool 34 arranged in pilot pressure reduction valve 32 by means of actuator 38, the pilot pressure for throttle valve 16, necessary according to the deceleration mode of the hydrostatic transmission, can be adjusted. Preferably with maximum energized actuator 38 no pressure reduction occurs in pilot pressure reduction valve 32, which means the pilot pressure at outlet 49 of pilot pressure reduction valve 32 corresponds to the support pressure at inlet 44 of pilot pressure reduction valve 32. Analogously, with powerless actuator 38 a maximum pressure reduction in pilot pressure reduction valve 32 takes place correspondingly, what means that the pilot pressure at outlet 49 of pilot pressure valve 32 comprise its minimum value. Independently of the position of shuttle valve 40, a throttling of the hydraulic flow rate can be prevented solely by energizing actuator 38. However, in case of an erroneous excitation of actuator 38, for instance in case of a cable breakage, the shuttle valve 40 fulfills a protection function for protecting the hydraulic pump in the reverse drive mode in order that the hydraulic pump in this operational mode of the hydrostatic transmission have not to work against a at least partly closed throttle valve 16. In malfunction of actuator 38 the pilot pressure reduction valve spool 34 would lower the support pressure and hence the pilot pressure to the second front face 19 of throttle valve spool 17, what will reduce the flow rate cross section of throttle valve 16. Hence, for protection of hydraulic pump in the reversed drive mode by means of bypass line 15 the support pressure bypasses pilot pressure reduction valve 32 and acts non-reduced via pilot pressure line 35 on second front face 19 of throttle valve 16 and holds the same open.

Such a malfunction of an actuator cannot occur in the embodiment according to FIG. 1, as the proportional throttle valve 60 is preferably controlled by the hydraulic pressures being present before and after the proportional throttle valve 60. However, it can occur, that due to a malfunction of another part, for instance by a breakdown of a throttle valve spring 20 or misalignment of the opening pressure for the proportional throttle valve 60, it can come to an activation of throttle valve 16 despite drive motor 2 has not reached its maximum admissible drag rotational speed. This bears, in particular in the reverse drive mode, the risk that the driving mechanism of hydraulic pump 4 is damaged, if drive motor 2 further increases its power (still haven't reached its maximum rotational speed). At the same time, throttle valve 16 closes hydraulic line 7 because the opening forces for throttle valve 16 are not sufficient to hold throttle valve 16 against the high pressure in hydraulic line 7 in the open position. By means of a check valve 72 arranged according to FIG. 6 in bypass line 70, the throttle valve 16 is bypassed, whereby such a situation can be avoided for the reversed drive operation in which hydraulic pump 4 cannot release its conveying volume. The check valve 72 fulfills analogously to shuttle valve 40 a protection function only for the reversed drive mode. Preferably, such devices or other devices common in the art are to be considered due to the arrangement for decelerating a hydrostatic transmission according to the invention with regard to safety reasons in order to avoid damages at the hydraulic pump.

In FIG. 5 a pilot pressure reduction valve spool 34 is shown in a position in which the support pressure being present at inlet 44 of valve housing 33 is not or only minimal reduced, as the pilot pressure valve 32 in consequence of the maximum force of actuator 38 supported by the force of pressure spring 36 is open maximum. At the same time, pilot pressure reduction valve spool 34 comprises at its right end portion a bigger diameter than at its distal left end. If the actuator 38 is switched powerless, for instance because its power supply is interrupted, the pressure being present at outlet 49 of pilot pressure reduction valves 32 shifts the pilot pressure reduction valve spool 34 against the force of pilot pressure reduction valve spring 36 towards the right, deviating from what is shown in FIG. 5, until the pressure reduction shoulder 39 of pilot pressure reduction valve spool 34 closes the pressure reduction bore 37 on its left side and opens the outlet 49 to charge pressure line 53. Thereby, when using, for instance, a solenoid as actuator 38, it is assured also in case of cable breakage, that the drive motor 2 cannot be over-revved, as the pilot pressure reduction valve spring 36 ensures a maximum reduction of the pilot pressure according to its preload.

In the position in which the pilot pressure reduction valve spool 34 has reached its maximum shifted position towards the right (deviating from FIG. 5) by means of the left end portion of the pilot pressure reduction valve spool 34 a charge pressure line 53 is opened, over which, with now closed pressure reduction bore 37, that means by closed transition between the connection line 14 to outlet 49 of pilot pressure valve 32, the pressure being present at outlet 49 can be depressurized to a lower pressure. This can be for instance the charge pressure generated by a charge pump 54 of the hydrostatic transmission 3 but for example also a tank pressure, if outlet 49 is to be depressurized to a tank. The connection possibility of outlet 49 to an area with low pressure means at the same time that the pilot pressure cannot fall under the low pressure level. Exemplarily, if the charge pressure is present in charge pressure line 53, with which if required, the closed working circuit can be filled up via the low pressure conducting hydraulic line, as common in the state of the art, this means in sense of the invention that the pilot pressure cannot fall under this charge pressure level. This means further that in working mode in which low pressure, which is present in hydraulic line 7, the pilot pressure which corresponds now to the charge pressure, holds the throttle valve open, as the charge pressure/pilot pressure acting opening on the throttle valve is bigger than the low pressure acting at the same time throttle-valve-closing on the first front face 18 of throttle valve 16.

Intermediate positions of the pilot pressure reduction valve spool 34 hence can be achieved by suitable energizing of actuator 38, what can be concluded of the explanations above in connection what is shown in FIG. 5. Hence, by controlling the force with which actuator 38 shifts the pilot pressure reduction valve spool 34 in the open position of the pilot pressure reduction valve, the support pressure can be reduced in a controlled way to a pilot pressure. The pilot pressure acts via pilot pressure line 35 on the second front face 19 of the throttle valve spool 17 and adjusts, as explained in detail above, the throttle cross section of throttle valve 16 such that the hydraulic power in return line 7, with which the hydraulic pump should be supported at the drive motor 2, drives the drive motor 2 to its maximum admissible break rotational speed, maintains the rotational speed and, further, ensures that the maximum admissible drag rotational speed of the drive motor 2 is not exceeded. Preferably, the force with which actuator 38 is energized will be controlled based on the rotational speed of drive motor 2. For this a rational speed sensor 13 is arranged exemplarily on a driving shaft connecting drive motor 2 with hydraulic pump 4 and forwarding the actual rotational speed via an electric connection line 12 to an electric control unit 11 specifying the current, with which for instance a solenoid used as actuator 38 is energized (see FIG. 2).

In the following the inventive method should be explained with the help of the embodiment shown in FIG. 2, whereby it is assumed that the flow direction through the closed hydraulic fluid circuit is in clockwise direction (see arrow A) and that the hydrostatic transmission is in a drive mode, whereby hydraulic fluid under high pressure is conveyed via hydraulic line 6 from the hydraulic pump 4 to the hydraulic motor 5. Via hydraulic line 7 hydraulic fluid under low pressure is returned by hydraulic motor 5 to hydraulic pump 4. In this initial situation throttle valve 16 is in its maximum open position, as in a drive mode the hydraulic power should not be lowered by throttle valve 16. Precondition for this is that the opening forces for throttle valve 16 on the second front face 19 of the throttle valve spool 17 are higher than the closing forces on the first front face 18 of throttle valve spool 17. This is achieved in a preferred embodiment of the invention by that the effective surfaces for the pressure forces on both front faces 18 and 19 of throttle valve spool 17 are of the same size and that throttle valve spring 20 on the first side 18 of throttle valve spool 17 moves the throttle valve spool 17 in that position, in which the flow rate cross section through throttle valve 16 is maximum.

At this point it may be noted that other measures common in the art for achieving this initial position of throttle valve 16 are covered by the inventive idea also, for instance the design of a pressure-effective surface on the first front face 18 being smaller as the pressure-effective surface on the second front face 19 of throttle valve spool 17, whereby, eventually, throttle valve spring 20 can be omitted or its force can be lowered or a mechanical, pneumatic, hydraulic or electric operable actuator can be used instead of, or additionally. According to the invention, it should be assured that in a drive mode with flow direction in clockwise direction according to FIG. 2 and in a operation condition with reversed flow direction that the opening forces on throttle valve spool 17 of throttle valve 16 are higher than the closing forces on throttle valve 16, whereby the support pressure present at outlet 30 of throttle valve 16 acts as a pressure force component on the first front face 18 as well as on the second front face 19 and that the resulting pressure forces are neutralizing each other and that throttle valve spool 17 is held by the hydraulic forces in a kind of pressure balance.

In case of the exemplarily chosen embodiment of FIG. 2, the effective surfaces on both front faces 18 and 19 of the throttle valve are of equal size and, hence, also the hydraulic pressure forces, if the pressure conducted to the second front face 19 is not throttled. For throttling a pilot pressure reduction valve 32 is provided, via which the support pressure being present at outlet 30 of throttle valve 16 is conducted to the second front face 19 of throttle valve spool 17. With flow direction in the hydraulic fluid circuit opposite to the clockwise direction, shuttle valve 40 closes outlet 49 of pressure reduction valve 32 and opens a bypass line 15 towards pilot pressure line 35, with which the pilot pressure reduction valve 32 is bypassed and the support pressure present at outlet 30 of throttle valve 16 is conducted non-reduced on the second front face 19 of throttle valve spool 17. Therewith, the above described initial situation for a drive- or deceleration mode with flow direction opposite the clockwise direction is ensured.

In a further preferred embodiment of the invention, shuttle valve 40 is shifted according to the pressures present at servo control unit 8 of hydraulic pump 4. However, every other actuation of the shuttle valve 40 common in the art is covered by the inventive idea.

The inventive deceleration method of the embodiment in FIG. 2 is applied only, if the hydrostatic transmission 3 is in a drag mode and if the flow direction through the hydraulic lines is effected in the clockwise direction. Starting from the above initial situation, in which the hydrostatic transmission 3 is initially in a drive mode and in which throttle valve 16, respectively throttle valve spool 17, is pressure force balanced, the hydrostatic transmission 3 should now pass over conceptually into the coasting mode. This results in that the hydraulic motor 5 works now as a pump and conveys hydraulic fluid under high pressure via hydraulic line 7 to hydraulic pump 4. According to the invention, the pressure generated by hydraulic motor 5 in the hydraulic fluid is throttled in a controlled manner by throttle valve 16, if hydraulic pump 4 cannot support the whole power generated by hydraulic motor 5 on drive motor 2, in order to not over-speed the same. Therefore, the pressure passing throttle valve 16 have to be reduced, in order that hydraulic pump 4 receives a reduced hydraulic power and the same or the drive machine 2, which is dragged in the coasting mode by hydraulic pump 4, are not damaged.

In order that in a coasting mode the maximum available drag power at the drive motor can be utilized for deceleration of the hydrostatic transmission, the hydraulic power conveyed to hydraulic pump 4 have to be adapted such that, under consideration of the displacement of hydraulic pump 4, the maximum admissible drag rotational speed of drive motor 2 is not exceeded. Preferably, one will set the maximum admissible drag operational speed of drive motor 2 on a value on which the drive motor 2 is at its optimum working point for a drag operation. The inventive method adapts the power conveyed downstream of the throttle valve 16 over hydraulic line 7 towards hydraulic pump 4 such that the rotational speed of drive motor 2 is maintained constant during the coasting- or drag operation on the rotational speed being maximum admissible for the drag operation.

Therewith, the inventive method achieves that during the coasting operation the maximum available brake power for the hydraulic pump 4 is used for decelerating the hydrostatic transmission 3. In the methods known from the state of the art up to date, the pressure in the hydraulic line towards the hydraulic pump is limited to a fixed maximum volume, independent from the flow rate volume. By this, the maximally at the hydraulic pump 4 supportable brake power was practically never used completely due to decreasing volumetric flow rate, as the hydraulic power at constant pressure with decreasing volumetric flow rate being conveyed to hydraulic pump 4 decreases. While maintaining the support pressure, the absorption volume of the hydraulic pump decreases and, therewith, the rotational speed, respectively the load torque of the connected drive motor. Not at all with the inventive method, with which the pressure passing throttle valve 16 is adapted to the maximum power with which hydraulic pump 4 is supportable on the drive motor 2. Therefore, for long periods of a deceleration operation, the hydraulic power downstream of throttle valve 16 will be constant as long as the hydraulic power generated by hydraulic motor 5 is lower than the maximum mechanical power, which is supportable by hydraulic pump 4 on drive motor 2. Passing this condition, no more reduction of the hydraulic power by the throttle valve 16 is required and the throttle valve is in its maximum open position and remains there, what means that the flow rate cross section through throttle valve 16 is maximum and a pressure reduction of the support pressure conducted on the second front face of throttle valve spool 7 being present at outlet 30 of throttle valve 16 does not occur, according to the invention.

If the rotational speed at the drive motor 2 raises over a predetermined maximum rotational speed in coasting operation of the hydraulic transmission 3, so, according to the invention, the support pressure present at outlet 30 of throttle valve 16 is conducted pressure-reduced on the second front face 19 of throttle valve spool 17, whereby the force balance present there is interrupted and throttle valve spool 17 is shifted by the initial, not reduced pressure on the first front face 19 of throttle valve spool 17 in direction to the closed position of throttle valve 16, such that the flow rate cross section is reduced. Thereby, the support pressure reduces at outlet 30 of throttle valve 16, whereby the closing force on the first front face 18 reduces and together with the reduced pressure force on the second front face 19 of throttle valve spool 17 a new force balance at throttle valve spool 17 will be adjusted, with which the flow rate cross section through throttle valve 16 is lower.

However, if the rotational speed of drive motor 2 drops during a coasting operation of the hydrostatic transmission 3, thus, the hydraulic power transmitted to the hydraulic pump 4 is lower than the coasting power being supportable on drive motor 2. The inventive method reduces then the throttling/reduction of the hydraulic power until the pre-defined maximum rotational speed of drive motor 2 is reached again and the maximum power supportable at the drive motor 2 flows through hydraulic line 7. The reduction of the throttling of hydraulic power is done according to the invention by reducing the pressure reduction of the pressure passing pilot pressure reduction valve 32 towards the second front face 19 over pilot pressure line 35. In this case, the force balance on both front faces 18 and 19 of the throttle valve spool 17 is cancelled by the pressure increase on second front face 19 and the higher opening forces shift the throttle valve spool 17 in direction of the opening position of throttle valve 16, whereby the support pressure at outlet 30 of throttle valve 15 increases and the closing acting forces on the first front face 18 increase until a new force balance on both front faces 18 and 19 of the throttle valve spool 17 is achieved.

In execution of the inventive method, the embodiment shown in FIG. 2 or the hydraulic pump 4 uses for instance a rotational speed sensor 13 for determining the rotational speed of drive motor 2 being connected with an electric control unit 11. The control unit controls an actuator 38 operating pilot pressure reduction valve 32 by exemplarily shifting a pilot pressure reduction valve spool 34 in a suitable position such that the high pressure conducted as pilot pressure via pilot pressure line 35 to second front face 19 of the throttle valve spool 17 is reduced accordingly, whereby the high pressure is introduced by hydraulic motor 5 into hydraulic line 7. If the drag rotational speed of the drive motor reaches then the predefined rotational speed limit, the control unit 11 will operate actuator 38 in order to prevent that the rotational speed of drive motor 2 increases further and in order to reduce the pilot pressure conducted via connection line 14 and pilot pressure line 35 to the second front face 19 of throttle valve spool 17. Thereby, the force balance at throttle valve spool 17 gets out of balance, as the support pressure conducted non-reduced on the first front face 18 of throttle valve spool 17 closes a bit more the throttle valve, that means the support pressure in return line 7 can be lowered. If the support pressure, which arises downstream of throttle valve 16 has dropped on a value, which is set on the second front face 19 of throttle valve spool 17 by pilot pressure reduction valve 32, throttle valve 16 is hold again in a pressure force balance condition and the hydraulic power conducted to the hydraulic pump 4 is according to the precondition being forwarded via control unit 11 and actuator 38 to pilot pressure reduction valve 32.

Summarizing, it could be said that the inventive method reduces the hydraulic power present downstream of throttle valve 16 if necessary such that during a coasting mode of a hydrostatic transmission 3, the hydraulic power always corresponds to the maximum brake power, with which the hydraulic pump is able to be supported on the drive motor 2 without over-revving the same. Hereby, a throttle valve spool 17 of a throttle valve 16 is held by hydraulic pressure forces in a kind of pressure balance in a defined position within the throttle valve 16, whereby a definite flow rate cross section of the throttle valve 16 is given free. By the controlled disturbance of the force balance of throttle valve 17 by means of the adjustability of the height of the hydraulic pressure forces opening throttle valve 16, throttle valve spool 17 can be shifted intentionally in its position such that at outlet 30 of throttle valve 16 the hydraulic power can be adjusted, and which can be supported mechanically on drive motor 2 maximally by hydraulic pump 4. Hereby, the maximum brake power, respectively the drag power, which the drive motor can assume from hydraulic pump 4 is predetermined by the same drive motor 2, by auxiliary drives and further consumers being driven by drive motor 2 as well as by power losses, which are acting on the working machine and comprise a rotational speed reduction effect on the same. By control of the rotational speed of the drive motor and/or, where applicable, of the hydraulic pump, by the inventive method an over-speeding of the drive motors can be prevented securely and, at the same time, during the whole coasting mode at any time the maximum drag power, respectively the deceleration power of the drive motor and, where applicable, the further auxiliary drives coupled to drive motor 2 can be utilized for deceleration of the hydrostatic transmission. The optimum drag rotational speed of the drive motor is maintained constant and the same is not over-revved. At the same time, only a minimum necessary amount of hydraulic power has to be transformed into heat and the maximum mechanical deceleration power being available can be used at any time in a coasting mode in an optimal manner.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A method for deceleration of a hydrostatic transmission being driven by a drive motor and comprising a closed hydraulic fluid circuit, in which a hydraulic pump being coupled mechanically with the drive motor and a hydraulic motor are arranged and with two the hydraulic pump and the hydraulic motor connecting hydraulic lines which according to the drive direction of the hydrostatic transmission can be a supply line or a return line for the hydraulic motor whereby in at least one of the two hydraulic lines a throttle valve is arranged being adjustable in its throttle cross section and which, if the corresponding the hydraulic line is a return line for hydraulic fluid under high pressure towards the hydraulic pump, the hydraulic line is dynamically adapted in its throttle cross section such that a hydraulic power is adjustable downstream of the throttle valve in the return line during a coasting mode corresponds to a deceleration power, which under consideration of the power consumption of auxiliary consumers and power loses, can be supported maximum at the drive motor;

in which for adjusting of the throttle cross section the high pressure being present in the return line downstream of the throttle valve is conducted to a first front face of a double sided throttle spool of the throttle valve such that the high pressure executes there a force lowering the throttle cross section and, at the same time, the pressure present in the return line either upstream before or downstream after the throttle valve or another high pressure in the work machine, is conducted via a connecting line and a pilot pressure line as a pilot pressure, being adjustable by a pi-lot valve, onto a second front face of a throttle spool executing there a force augmenting the throttle cross section such that the throttle valve spool can be hold in adjustable force balances by means of the two forces;

in which a pilot pressure reduction valve used as a pilot valve lowers the pressure present in the connection line; and in which the pressure in the connection line is conducted to the pilot pressure reduction valve and is conducted only then to an outlet of the pilot pressure reduction valve as a pilot pressure towards the second front face of the throttle valve if a shuttle valve, being controllable by the servo pressures of a servo control unit of the hydraulic pump, frees in a first position the outlet of the pilot pressure reduction valve.

2. The method according to claim 1, in which the throttle cross section of the throttle valve is adapted depending on the rotational speed of the drive motor, the hydraulic pump and/or other devices mechanically coupled with the drive motor or the hydraulic pump.

3. The method according to claim 1, in which a proportional throttle valve used as a pilot valve, reduces the pressure being present in the pilot pressure line.

4. The method according to claim 3 in which over a metering orifice a signal depending on the rotational speed is taken off in form of a pressure difference and the proportional throttle valve for depressurizing of the pressure in the pilot pressure line is operated, if the pressure difference exceeds a pre-determined value whereas the metering orifice is arranged in a hydraulic flu-id line conducting a hydraulic fluid volumetric flow rate being proportional to the rotational speed of the drive motor.

5. The method according to claim 1, in which the pilot pressure reduction valve is operated mechanically, pneumatically, hydraulically or electrically by means of an actuator in dependency of the rotational speed of the drive motor.

6. The method according to claim 1, in which the shuttle valve in the first position shuts a bypass line bypassing the pilot pressure reduction valve, where-by the bypass line is freed by the shuttle valve in a second position, in which the shuttle valve at the same time shuts the outlet of pilot pressure reduction valve.

7. An arrangement for deceleration of a hydrostatic transmission driven by a drive motor comprising a closed hydraulic fluid circuit in which a hydraulic pump coupled to the drive motor and a hydraulic motor are arranged, and with two hydraulic lines connecting the hydraulic pump and the hydraulic motor which, according to the drive direction of the hydrostatic transmission, may be a supply line or a return line for the hydraulic motor whereas in at least one of the two hydraulic lines a throttle valve is arranged with a throttle valve spool having a first front face and a second front face and being adjustable in its throttle cross section, whereby the first front face of the throttle valve spool may be forced with a throttle cross section closing hydraulic force generated by the pressure downstream of throttle valve and whereby the second front face of the throttle valve spool may be forced by a resilient force and a throttle cross section opening hydraulic force generated by a pi-lot pressure, whereby the pilot pressure arises from the pressure in return line upstream or downstream of the throttle valve or another high pressure and whereby the pilot pressure is adjustable in its height by a pilot valve in which between the connection line and a pilot pressure line, conducting the pilot pressure to the second front face of the throttle valve spool, a pilot pressure reduction valve is arranged and in which the connecting line conducts the pressure being pre-sent in the hydraulic line downstream after or upstream before the throttle valve to the pressure reduction valve; and in which a shuttle valve is arranged downstream after the pilot pressure reduction valve with which an outlet of the pressure reduction valve can opened or closed, whereby, at the same time, function-inverted, a bypass line bypassing the pilot pressure reduction valve can be closed or opened by the shuttle valve, whereby the pressure in the connection line can be conducted non-reduced over the bypass line and the pilot pressure line to the second front face of the throttle valve spool.

8. The arrangement according to claim 7, with a pilot pressure line connecting a proportional throttle valve with the second front face of the throttle valve spool, whereby a connection line leads into the pilot pressure line conducting a pressure being present in the return line downstream after or upstream before the throttle valve or conducting any other high pressure towards pilot pressure line.

9. The arrangement according to claim 8, in which by means of a metering orifice a signal depending on the rotational speed in form of a pressure difference can be taken off and with which the proportional throttle valve may be opened, if the pressure difference at the metering orifice exceeds a pre-determined value whereby the metering orifice is arranged in a hydraulic flu-id line of the hydrostatic transmission conducting a hydraulic flow rate de-pending on the rotational speed on the drive motor.

10. The arrangement according to claim 9 in which the hydraulic fluid line is a charge pressure line and the hydraulic fluid rate depending on the rotational speed the can be generated by a charge pump being coupled with the drive motor and/or with the hydraulic pump.

11. The arrangement according to claim 7, in which the shuttle valve can be shifted by the servo pressures usable for the displacement of the hydraulic pump.

12. The arrangement according to claim 7, in which the resilient force acting on the second front face of the throttle valve is adjustable.

13. The arrangement according to claim 7, in which the pilot valve is mechanically, pneumatically, hydraulically, or electrically controllable by an actuator.

14. The arrangement according to claim 13, in which the actuator is a solenoid.

15. The method according to claim 2, in which for adjusting of the throttle cross section the high pressure being present in the return line downstream of the throttle valve is conducted to a first front face of a double sided throttle spool of the throttle valve such that the high pressure executes there a force lowering the throttle cross section and, at the same time, the pressure present in the return line either upstream before or downstream after the throttle valve or another high pressure in the work machine, is conducted via a connecting line and a pilot pressure line as a pilot pressure, being adjustable by a pi-lot valve, onto a second front face of a throttle spool executing there a force augmenting the throttle cross section such that the throttle valve spool can be hold in adjustable force balances by means of the two forces.

* * * * *